US012366859B2

(12) United States Patent
Pendergraft et al.

(10) Patent No.: US 12,366,859 B2
(45) Date of Patent: Jul. 22, 2025

(54) TROLLING MOTOR AND SONAR DEVICE DIRECTIONAL CONTROL

(71) Applicant: Navico, Inc., Tulsa, OK (US)

(72) Inventors: Dustyn P. Pendergraft, Claremore, OK (US); Jeremiah D. Clark, Tulsa, OK (US)

(73) Assignee: Navico, Inc., Tulsa, OK (US)

( * ) Notice: Subject to any disclaimer, the term of this patent is extended or adjusted under 35 U.S.C. 154(b) by 386 days.

(21) Appl. No.: 18/147,101

(22) Filed: Dec. 28, 2022

(65) Prior Publication Data
US 2023/0143089 A1 May 11, 2023

Related U.S. Application Data

(63) Continuation-in-part of application No. 17/371,192, filed on Jul. 9, 2021, now Pat. No. 11,760,457.

(51) Int. Cl.
*G05D 1/00* (2024.01)
*B63B 79/10* (2020.01)
(Continued)

(52) U.S. Cl.
CPC ........... *G05D 1/0206* (2013.01); *B63B 79/10* (2020.01); *B63H 20/12* (2013.01); *B63H 21/213* (2013.01);
(Continued)

(58) Field of Classification Search
CPC .... G05D 1/0206; G05D 1/0016; B63B 79/10; B63H 20/12; B63H 21/213;
(Continued)

(56) References Cited

U.S. PATENT DOCUMENTS 2,877,733 A 3/1959 Harris
3,598,947 A 8/1971 Osborn
(Continued)

FOREIGN PATENT DOCUMENTS

EP 2 602 639 A1 6/2013
EP 1 891 461 B1 5/2014
(Continued)

OTHER PUBLICATIONS

"Minn Kota Riptide ST Foot Pedal Accessory User Manual;" retrieved Dec. 7, 2017 from file:///C:/Users/PForbes/Downloads/2377123rc_RT_ST_Foot_Pedal_Manual.pdf.; 4 pages.
(Continued)

*Primary Examiner* — Rachid Bendidi
*Assistant Examiner* — Joseph Anderson Yanoska
(74) *Attorney, Agent, or Firm* — Nelson Mullins Riley & Scarborough LLP

(57) ABSTRACT

Example steering control systems and methods for multiple devices are provided herein. A system includes a trolling motor assembly having a propulsion motor and a steering actuator and a sonar assembly comprising a transducer assembly and a directional actuator. The system further includes a user input assembly that is configured to detect user activity related to controlling operation of the trolling motor assembly and operation of the sonar assembly. The system further includes a processor that is configured to determine a direction of turn based on user activity, generate an electrical turning input signal indicating the direction of turn, and direct either one or both of the steering actuator and the directional actuator, via the turning input signal, to adjust a direction of either one or both of the propulsion motor and the transducer assembly accordingly.

23 Claims, 16 Drawing Sheets

(51) Int. Cl.
*B63H 20/12* (2006.01)
*B63H 21/21* (2006.01)

(52) U.S. Cl.
CPC ..... *G05D 1/0016* (2013.01); *B63H 2021/216* (2013.01)

(58) Field of Classification Search
CPC ........ B63H 2021/216; B63H 2025/028; B63H 21/17; B63H 25/02; B63H 25/42; B63H 20/007; G01S 7/521; G01S 15/42; G01S 15/89; G01S 15/96; G10K 11/006
See application file for complete search history.

(56) References Cited

U.S. PATENT DOCUMENTS

| | | |
|---|---|---|
| 3,807,345 A | 4/1974 | Peterson |
| 4,824,408 A | 4/1989 | Aertker et al. |
| 5,293,351 A | 3/1994 | Noponen |
| 5,420,828 A | 5/1995 | Geiger |
| 5,525,081 A * | 6/1996 | Mardesich ........... B63H 20/007 440/6 |
| 5,892,338 A | 4/1999 | Moore et al. |
| 6,054,831 A | 4/2000 | Moore et al. |
| 6,181,644 B1 | 1/2001 | Gallagher |
| 6,325,684 B1 | 12/2001 | Knight |
| 6,447,347 B1 | 9/2002 | Steinhauser |
| 6,504,794 B2 | 1/2003 | Haase et al. |
| 6,507,164 B1 | 1/2003 | Healey et al. |
| 6,524,144 B2 | 2/2003 | Pasley |
| 6,661,742 B2 | 12/2003 | Hansen |
| 6,678,589 B2 | 1/2004 | Robertson et al. |
| 6,868,360 B1 | 3/2005 | Olstad et al. |
| 6,870,794 B2 | 3/2005 | Healey |
| 6,902,446 B1 | 6/2005 | Healey |
| 6,909,946 B1 | 6/2005 | Kabel et al. |
| 6,919,704 B1 | 7/2005 | Healey |
| 7,004,804 B2 | 2/2006 | Bernloehr et al. |
| 7,190,636 B1 | 3/2007 | Depaola |
| 7,195,526 B2 | 3/2007 | Bernloehr et al. |
| 7,268,703 B1 | 9/2007 | Kabel et al. |
| 7,303,595 B1 | 12/2007 | Janitz |
| 7,371,218 B2 | 5/2008 | Walston et al. |
| 7,430,461 B1 | 9/2008 | Michaels |
| 7,452,251 B2 | 11/2008 | Boebel |
| 7,538,511 B2 | 5/2009 | Samek |
| D594,034 S | 6/2009 | Bernloehr et al. |
| 7,542,376 B1 | 6/2009 | Thompson et al. |
| 7,633,431 B1 | 12/2009 | Wey |
| 7,722,417 B2 | 5/2010 | Bernloehr et al. |
| 8,106,617 B1 | 1/2012 | Holley |
| 8,195,084 B2 | 6/2012 | Xiao |
| 8,221,175 B2 | 7/2012 | Mynster |
| 8,305,844 B2 | 11/2012 | DePasqua |
| 8,645,012 B2 | 2/2014 | Salmon et al. |
| 8,761,976 B2 | 6/2014 | Salmon et al. |
| 8,814,129 B2 | 8/2014 | Todd et al. |
| 8,879,359 B2 | 11/2014 | DePasqua |
| 8,888,065 B2 | 11/2014 | Logan |
| 8,896,480 B1 | 11/2014 | Wilson et al. |
| 8,991,280 B2 | 3/2015 | Wireman |
| 9,127,707 B1 | 9/2015 | Huntley |
| 9,132,900 B2 | 9/2015 | Salmon et al. |
| 9,135,731 B2 | 9/2015 | Lauenstein et al. |
| 9,160,210 B2 | 10/2015 | Perry |
| 9,162,743 B1 | 10/2015 | Grace et al. |
| 9,201,142 B2 | 12/2015 | Antao |
| 9,278,745 B2 | 3/2016 | Kooi, Jr. et al. |
| 9,290,256 B1 | 3/2016 | Wireman et al. |
| 9,296,455 B2 | 3/2016 | Bernloehr et al. |
| 9,322,915 B2 | 4/2016 | Betts et al. |
| 9,394,040 B2 | 7/2016 | Grace et al. |
| 9,459,350 B2 | 10/2016 | Betts et al. |
| 9,505,477 B2 | 11/2016 | Grace et al. |
| 9,507,562 B2 | 11/2016 | Bailey |
| 9,594,375 B2 | 3/2017 | Jopling |
| 9,596,839 B2 | 3/2017 | Bailey |
| 9,676,462 B2 | 6/2017 | Bernloehr et al. |
| 9,746,874 B2 | 8/2017 | Johnson et al. |
| 9,758,222 B2 | 9/2017 | Grace et al. |
| 9,836,129 B2 | 12/2017 | Clark |
| 10,025,312 B2 | 7/2018 | Langford-Wood |
| 10,061,025 B2 | 8/2018 | Kirmani |
| 10,114,119 B2 | 10/2018 | Horner et al. |
| 10,114,470 B2 | 10/2018 | Clark |
| 10,241,200 B2 | 3/2019 | Sayer et al. |
| 10,247,823 B2 | 4/2019 | Brown et al. |
| 10,311,715 B2 | 6/2019 | Jopling |
| 10,324,175 B2 | 6/2019 | Laster |
| 10,451,732 B2 | 10/2019 | Laster |
| 10,460,484 B2 | 10/2019 | Hovland et al. |
| 2003/0191562 A1 | 10/2003 | Robertson et al. |
| 2003/0203684 A1 | 10/2003 | Healey |
| 2003/0214483 A1 | 11/2003 | Hammer et al. |
| 2005/0255761 A1 | 11/2005 | Bernloehr et al. |
| 2006/0116031 A1 | 6/2006 | Bernloehr et al. |
| 2009/0037040 A1 | 2/2009 | Salmon et al. |
| 2009/0227158 A1 | 9/2009 | Bernloehr et al. |
| 2012/0014220 A1 | 1/2012 | DePasqua |
| 2012/0015566 A1 * | 1/2012 | Salmon ............... G05D 1/0206 701/467 |
| 2012/0060733 A1 | 3/2012 | Maki et al. |
| 2012/0204467 A1 | 8/2012 | Palmer et al. |
| 2012/0232719 A1 | 9/2012 | Salmon et al. |
| 2012/0299764 A1 | 11/2012 | Haneda et al. |
| 2013/0044569 A1 | 2/2013 | DePasqua |
| 2013/0215719 A1 | 8/2013 | Betts et al. |
| 2014/0203162 A1 | 7/2014 | Logan |
| 2014/0249698 A1 | 9/2014 | Salmon et al. |
| 2014/0269164 A1 | 9/2014 | Betts et al. |
| 2014/0277851 A1 | 9/2014 | Grace et al. |
| 2014/0336854 A1 | 11/2014 | Salmon et al. |
| 2015/0016130 A1 | 1/2015 | Davis et al. |
| 2015/0063059 A1 | 3/2015 | DePasqua |
| 2015/0063060 A1 | 3/2015 | DePasqua |
| 2015/0151824 A1 | 6/2015 | Wireman |
| 2015/0346729 A1 | 12/2015 | Grace et al. |
| 2016/0016651 A1 | 1/2016 | Anderson et al. |
| 2016/0253150 A1 | 9/2016 | Williams et al. |
| 2017/0038460 A1 | 2/2017 | Clark |
| 2017/0285167 A1 | 10/2017 | Proctor et al. |
| 2017/0371039 A1 | 12/2017 | Clark et al. |
| 2018/0244361 A1 | 8/2018 | Laster |
| 2018/0288990 A1 | 10/2018 | Laster et al. |
| 2018/0329056 A1 | 11/2018 | Smith et al. |
| 2018/0365246 A1 | 12/2018 | Laster et al. |
| 2019/0072951 A1 | 3/2019 | Clark et al. |
| 2019/0176952 A1 | 6/2019 | Clark et al. |
| 2019/0176953 A1 | 6/2019 | Clark et al. |
| 2019/0331779 A1 | 10/2019 | Sandretto |
| 2020/0070943 A1 | 3/2020 | Clark et al. |
| 2020/0272152 A1 | 8/2020 | Combs |
| 2021/0056944 A1 | 2/2021 | Vance |
| 2021/0278514 A1* | 9/2021 | Hughes .................. G01S 7/521 |
| 2021/0371074 A1 | 12/2021 | Lammers-Meis |
| 2022/0381906 A1 | 12/2022 | Combs et al. |

FOREIGN PATENT DOCUMENTS

| | | |
|---|---|---|
| EP | 3663888 A1 | 6/2020 |
| GB | 2 421 312 A | 6/2006 |
| WO | WO 95/28682 A1 | 10/1995 |
| WO | WO 2013/126761 A1 | 8/2013 |
| WO | WO 2014/144471 A1 | 9/2014 |
| WO | WO-2015126677 A2 * | 8/2015 ........... B06B 1/0284 |
| WO | WO 2023/224854 A1 | 11/2023 |

OTHER PUBLICATIONS

"Bass Resource The Ultimate Bass Fishing Resource Guide: Bass Fishing Forums Trolling Motor Foot Pedal—Do You Mount to Deck?;" retrieved Dec. 8, 2017 from https://www.bassresource.com/

(56) References Cited

OTHER PUBLICATIONS bass-fishing-forums/topic/190825-trolling-motor-foot-pedal-do-you-mount-to-deck/.

Shepardson; "Google wins U.S. approval for new radar-based motion sensor;" Reuters; Jan. 1, 2019; retrieved Feb. 13, 2020 from https://www.reuters.com/article/us-google-sensor/google-wins-u-s-approval-for-radar-based-hand-motion-sensor-idUSKCN1OVISH.

Feldler; "Teaching With NYT Virtual Reality Across Subjects;" The New York Times; Mar. 28, 2019; retrieved Feb. 13, 2020 from https://www.nytimes.com/2019/03/28/learning/lesson-plans/teaching-with-nyt-virtual-reality-across-subjects.html.

Smolan et al; "The Click Effect;" New York Times VR; retrieved Feb. 13, 2020 from https://www.with.in/watch/CnVHWFg.

Porathe; "3-D Nautical Charts and Safe Navigation; Department of Innovation, Design and Product Development;" Doctoral Dissertation No. 27, Mälardalen University; Jan. 1, 2006; pp. 1-307 (XP055119720).

U.S. Appl. No. 16/791,335 entitled "Systems and Methods for Controlling Operations of Marine Vessels;" filed Feb. 14, 2020 in the name of Kristopher C. Snyder et al.

U.S. Appl. No. 17/326,409 entitled "Sonar Steering Systems and Associated Methods;" filed May 21, 2021 in the name of Christopher D. Crawford et al.

"LiveSweep (Wired or Wireless Pedal) Mounting Hardware Included;" *Cornfield Crappie Gear*; retrieved Jul. 19, 2021 from https://www.cornfieldcrappiegear.com/product-page/livesweep-wired-pedal-mounting-hardware-included.

"Google Glass;" *Wikipedia*; retrieved Apr. 18, 2013 from http://en.wikipedia.org/wiki/Google_Glass.

"Navico set to GoFree"; May 1, 2012; retrieved Apr. 18, 2013 from http://www.marinebusiness.com.au/archive/navico-set-to-gofree.

Jun. 16, 2014 Search Report and Written Opinion issued in International Patent Application No. PCT/US2014/021133.

"Motor Guide Xi5 Wireless Foot Pedal;" retrieved Dec. 7, 2017 from http://www.motorguide.com/store/accessory/xi5-wireless-foot-pedal0.

"Magic Leap Quick Start Guide;" 2018; retrieved Feb. 13, 2020 from https://assets.ctfassets.net/b173eiperqoo/4H4PJgU9C0GySyie4QeuWE/c7ef230a10147e86173dd9250ce5b064/180606_QSG_277x190mm_PANTONE_v1.pdf.

*Cornfield Crappie Gear*; retrieved Jul. 19, 2021 from https://www.cornfieldcrappiegear.com/.

Jun. 12, 2022, Extended European Search Report issued in European Patent Application No. 22183815.4.

* cited by examiner

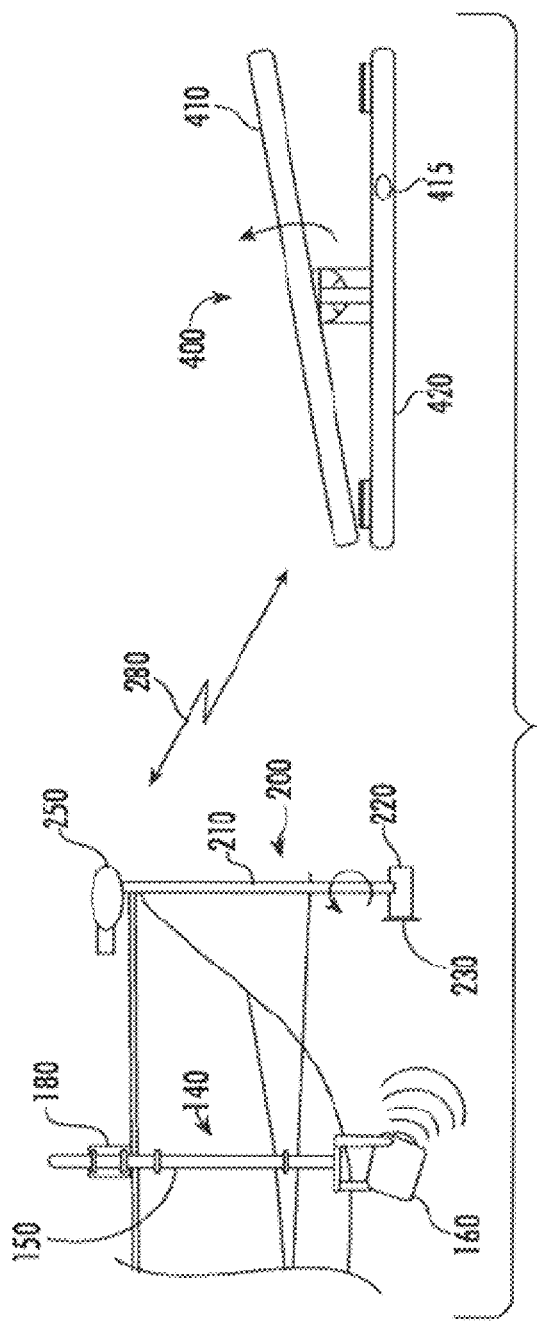
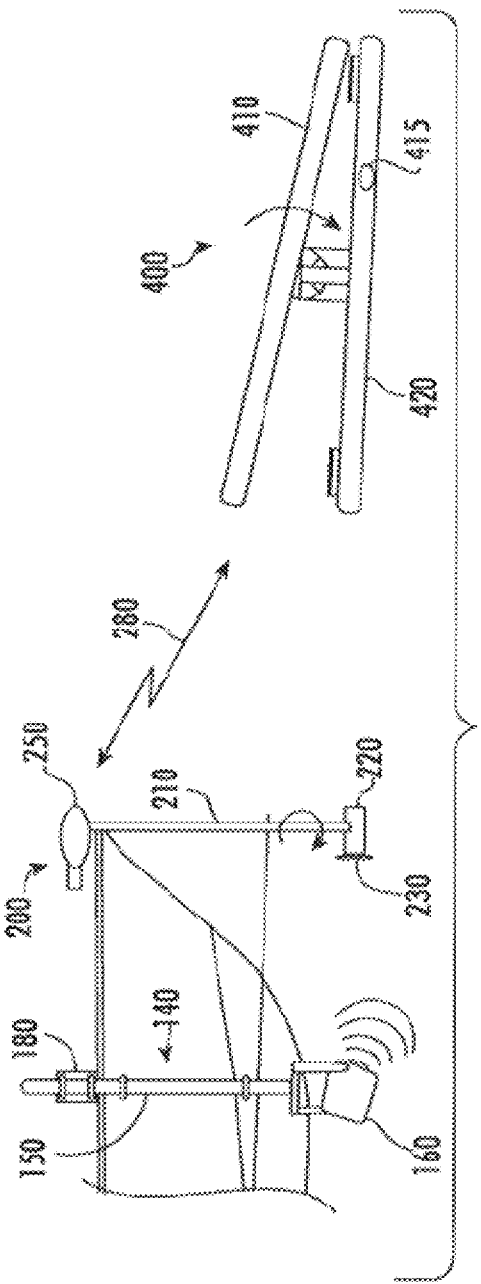

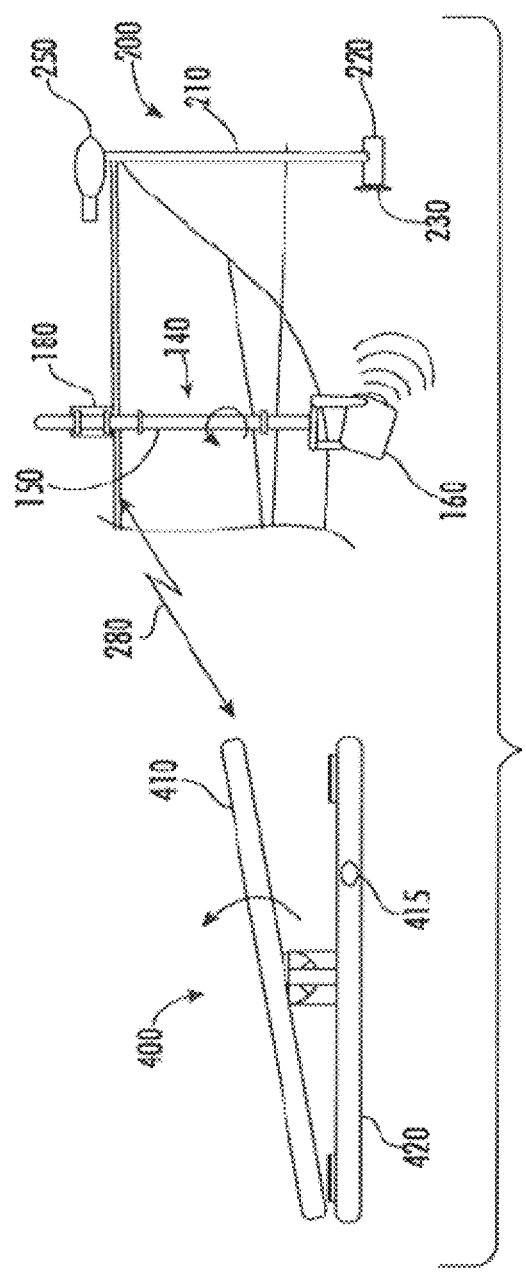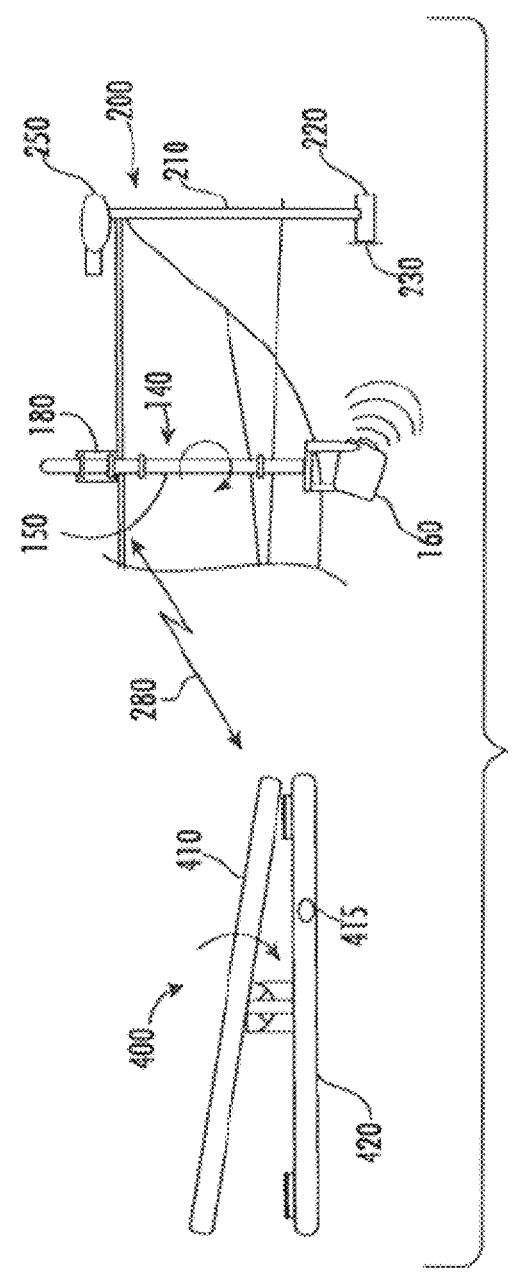

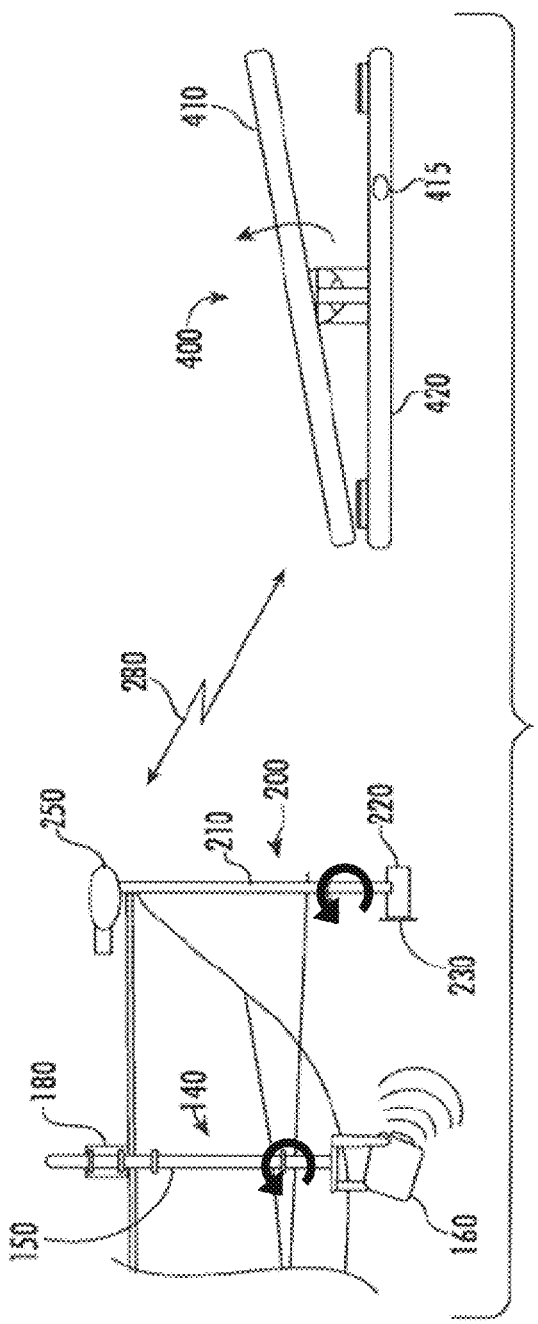
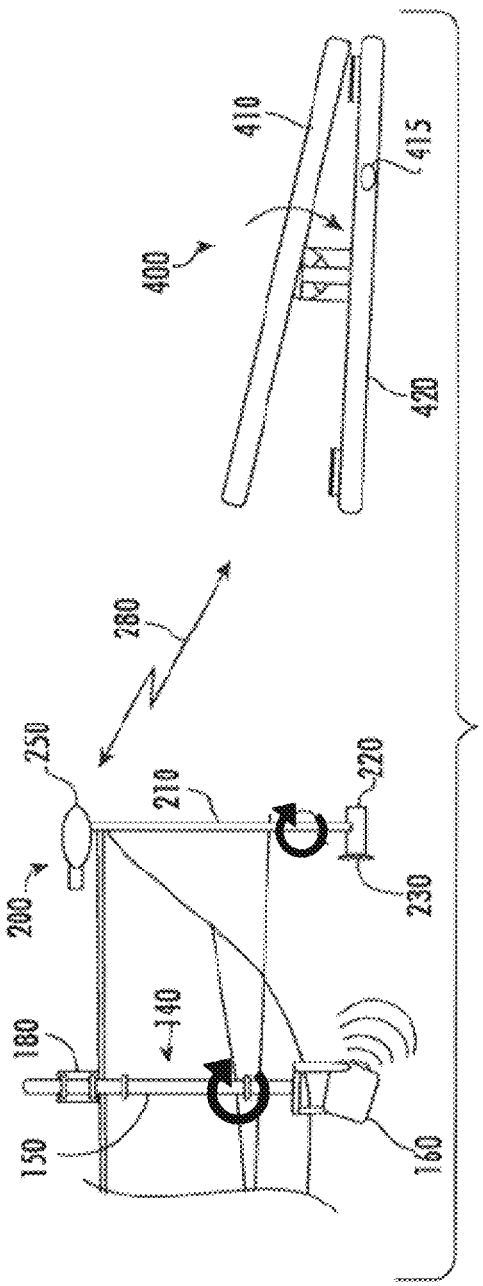
FIG. 8A
FIG. 8B

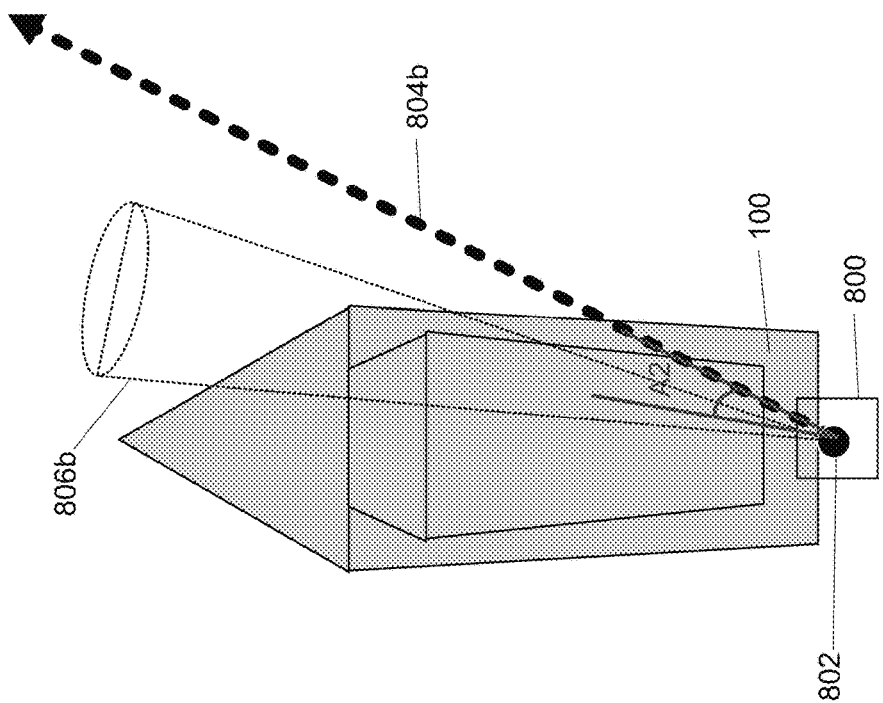
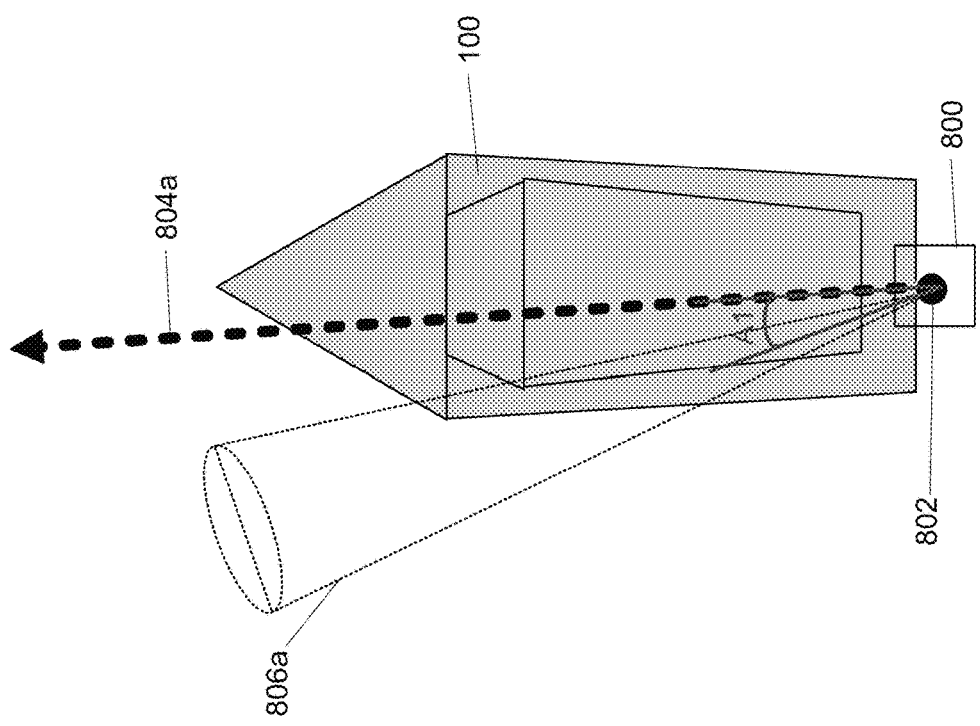

TROLLING MOTOR AND SONAR DEVICE DIRECTIONAL CONTROL

CROSS-REFERENCE TO RELATED APPLICATION(S)

This application claims priority to and is a continuation-in-part application of U.S. application Ser. No. 17/371,192, entitled "Trolling Motor Foot Pedal Controlled Sonar Device", filed Jul. 9, 2021, the contents of which is incorporated by reference herein in its entirety.

FIELD OF THE INVENTION

Embodiments of the present invention relate generally to marine technology and, more particularly, to marine sonar and propulsion systems.

BACKGROUND OF THE INVENTION

Both trolling motors and sonar (SOund Navigation and Ranging) systems are often used during fishing or other marine activities. Trolling motors attach to the watercraft and propel the watercraft along a body of water. Often, trolling motors may provide secondary propulsion for precision maneuvering that can be ideal for fishing activities. Trolling motors offer benefits in the areas of ease of use and watercraft maneuverability, among others. Sonar systems are used to detect waterborne or underwater objects. For example, sonar devices may be used to determine depth and bottom topography, detect fish, locate wreckage, etc. In this regard, due to the extreme limits to visibility underwater, sonar is typically the most accurate way to locate objects underwater and provide an understanding of the underwater environment. That said, further innovation with respect to the operation of both trolling motors and sonar systems, particularly in the area of simplifying the ease of use, is desirable.

BRIEF SUMMARY OF THE INVENTION

According to various example embodiments, a system including a trolling motor assembly, a sonar system, and a navigation control device is provided for simplified operations.

Conventional trolling motor systems employ a navigation control device that, in response to user activity (e.g., through interaction with the navigation control device such as by depressing a foot pedal and/or pressing one or more buttons on a remote control), electronically controls both the direction and speed of the propulsion system (e.g., the propeller and motor assembly). Similarly, conventional directionally-enabled sonar systems may include a separate control device that, in response to user activity, electronically controls the direction in which a transducer assembly of the sonar system is directed with respect to the watercraft. In this manner, a user is able to direct the "picture" (or image) of the underwater environment to the desired location relative to the watercraft. Various embodiments described herein are directed to electronically controlled trolling motor assemblies and sonar systems that utilize a single control device, thereby reducing the amount of equipment required on the deck of a watercraft. Further, the known nature of use of the foot pedal can be leveraged for directional control of the sonar system. Additionally or alternatively, such a single user input assembly may be used to control other operations on the watercraft.

When engaged in watercraft navigation and/or other activities, such as fishing, a user may have limited attention and/or hand accessibility. In this regard, having to control multiple systems (e.g., one or more propulsion systems and/or one or more sonar systems) can be difficult. Thus, it would be beneficial to limit any processes and/or activities that may cause a user to lose focus or have to disengage in the activity. Accordingly, various embodiments described herein are configured to provide for easy independent and/or synchronized directional control of various propulsion systems (e.g., a trolling motor, main propulsion motor, etc.) and sonar systems. Such control may, in some embodiments, occur with a single control device and/or with a single button press. In some embodiments, the directional control may be synchronized such that the direction of the propulsion system and the sonar system adjust (e.g., turn) together and such that they are pointing in the same direction. Such control may, for example, be accomplished with a single user input control device. In some embodiments, one or more correction instructions may be sent to one of the systems to ultimately cause the systems to turn together. This may include causing the systems to turn toward, for example, a point of interest. In this regard, in some embodiments, the directional control of the propulsion system may be independently controllable from that of the sonar system (e.g., whether the two systems are physically separate or even if the two systems are attached to each other).

In an example embodiment, a system is provided. The system includes a trolling motor assembly including a propulsion motor and a steering actuator, and the steering actuator is configured to adjust a direction of the propulsion motor. The system also includes a sonar assembly including a transducer assembly and a directional actuator. The directional actuator is configured to adjust a direction of the transducer assembly, and the directional actuator is configured to independently reorient with respect to the steering actuator of the trolling motor assembly. The system also includes a user input assembly, and the user input assembly is configured to detect user activity related to at least one of controlling the direction of the propulsion motor of the trolling motor assembly or controlling the direction of the transducer assembly of the sonar assembly. The system also includes a processor, and the processor is configured to receive user input via the user input assembly and determine whether the received user input corresponds to either (a) a desired directional turning of both the direction of the propulsion motor of the trolling motor assembly and the direction of the transducer assembly of the sonar assembly or (b) a desired independent directional turning of either the direction of the propulsion motor of the trolling motor assembly or the direction of the transducer assembly of the sonar assembly. In an instance in which the user input corresponds to (a) the desired directional turning of both the direction of the propulsion motor of the trolling motor assembly and the direction of the transducer assembly of the sonar assembly, the processor is configured to generate at least one first turning input signal to cause the steering actuator of the trolling motor assembly to cause the direction of the propulsion motor to adjust in a direction indicated by the user input and to cause the directional actuator of the sonar assembly to cause the direction of the transducer assembly to adjust in the direction indicated by the user input such that both the direction of the propulsion motor and the direction of the transducer assembly adjust in a same direction and cause the at least one first turning input signal to be provided to the steering actuator to cause the adjustment of the direction of the propulsion motor and to be provided to the directional actuator to cause the adjustment of the direction of the transducer assembly. In an instance in which the user input corresponds to (b) the desired independent directional turning of either the direction of the propulsion motor of the trolling motor assembly or the direction of the transducer assembly of the sonar assembly, the processor is configured to determine whether the received user input corresponds to the desired independent directional turning of either (i) the direction of the propulsion motor of the trolling motor assembly or (ii) the direction of the transducer assembly of the sonar assembly. In an instance in which the user input corresponds to (i) the direction of the propulsion motor of the trolling motor assembly, the processor is configured to generate at least one second turning input signal to cause the steering actuator of the trolling motor assembly to cause the direction of the propulsion motor to adjust in a direction indicated by the user input such that the direction of the propulsion motor changes independent of the direction of the transducer assembly and cause the at least one second turning input signal to be provided to the steering actuator to cause the adjustment of the direction of the propulsion motor. In an instance in which the user input corresponds to (ii) the direction of the transducer assembly of the sonar assembly, the processor is configured to generate at least one third turning input signal to cause the directional actuator of the sonar assembly to cause the direction of the transducer assembly to adjust in the direction indicated by the user input such that the direction of the transducer assembly changes independent of the direction of the propulsion motor and cause the at least one third turning input signal to be provided to the directional actuator to cause the adjustment of the direction of the transducer assembly.

In some embodiments, the processor may be further configured to generate at least one correction signal to cause either the steering actuator of the trolling motor assembly to cause the direction of the propulsion motor to adjust or the directional actuator of the sonar assembly to cause the direction of the transducer assembly to adjust, such that the propulsion motor and the transducer assembly each faces in a same final direction after application of a corrective rotation caused by the at least one correction signal and cause the at least one correction signal to be provided to the steering actuator to cause the adjustment of the direction of the propulsion motor or to be provided to the directional actuator to cause the adjustment of the direction of the transducer assembly.

In some embodiments, in the instance in which the user input corresponds to (a) the desired directional turning of both the direction of the propulsion motor of the trolling motor assembly and the direction of the transducer assembly of the sonar assembly, the processor may be further configured to cause the at least one correction signal to be provided to the steering actuator to cause the adjustment of the direction of the propulsion motor or to be provided to the directional actuator to cause the adjustment of the direction of the transducer assembly before it causes the at least one first turning input signal to be provided to the steering actuator to cause the adjustment of the direction of the propulsion motor and to be provided to the directional actuator to cause the adjustment of the direction of the transducer assembly.

In some embodiments the processor may be further configured to determine which of the propulsion motor and the transducer assembly faces in a direction that is farther from a neutral direction. In an instance in which the propulsion motor faces in a direction that is farther from the neutral direction, the processor may be configured to generate the at least one correction signal to cause the steering actuator of the trolling motor assembly to cause the direction of the propulsion motor to adjust, such that the propulsion motor and the transducer assembly each faces in a same direction after adjustment, and cause the at least one correction signal to be provided to the steering actuator to cause the adjustment of the direction of the propulsion motor. In an instance in which the transducer assembly faces in a direction that is farther from the neutral direction, the processor may be configured to generate the at least one correction signal to cause the directional actuator of the sonar assembly to cause the direction of the transducer assembly to adjust, such that the propulsion motor and the transducer assembly each faces in a same direction after adjustment, and cause the at least one correction signal to be provided to the directional actuator to cause the adjustment of the direction of the transducer assembly.

In some embodiments, the processor may be further configured to generate at least one first correction signal to cause the steering actuator of the trolling motor assembly to cause the direction of the propulsion motor to adjust and at least one second correction signal to cause the directional actuator of the sonar assembly to cause the direction of the transducer assembly to adjust, such that the propulsion motor and the transducer assembly each faces in a same final direction after adjustment, and cause the at least one first correction signal to be provided to the steering actuator to cause the adjustment of the direction of the propulsion motor and the at least one second correction signal to be provided to the directional actuator to cause the adjustment of the direction of the transducer assembly.

In some embodiments, the first correction signal may include a first rate of turn, and the second correction signal may include a second rate of turn. The first rate of turn and second rate of turn may be configured such that the propulsion motor and the transducer assembly each faces in the same final direction at a same time.

In some embodiments, the user input assembly may include a mode select button. The mode select button may include at least a first mode indicating that the trolling motor assembly and the sonar assembly should be controlled at a same time, and the first mode may correspond to the instance in which the user input corresponds to (a) the desired directional turning of both the direction of the propulsion motor of the trolling motor assembly and the direction of the transducer assembly of the sonar assembly.

In some embodiments, the mode select button may include a second mode indicating that either the trolling motor assembly or the sonar assembly should be controlled independently, and the second mode may correspond to the instance in which the user input corresponds to (b) the desired independent directional turning of either the direction of the propulsion motor of the trolling motor assembly or the direction of the transducer assembly of the sonar assembly.

In some embodiments, the sonar assembly may be attached to the trolling motor assembly.

In some embodiments, the sonar assembly may be separate from the trolling motor assembly.

In some embodiments, the user input assembly may include a foot pedal.

In some embodiments, the user input assembly may include a wireless remote.

In some embodiments, the user input assembly may include a multi-function display.

In some embodiments, the desired directional turning of both the direction of the propulsion motor of the trolling motor assembly and the direction of the transducer assembly of the sonar assembly may be a desired synchronized directional turning of both the direction of the propulsion motor of the trolling motor assembly and the direction of the transducer assembly of the sonar assembly.

In some embodiments, the at least one first turning input signal may cause the propulsion motor of the trolling motor assembly and the transducer assembly of the sonar assembly to move simultaneously while pointing in the same direction.

In some embodiments, in the instance in which the user input corresponds to (a) the desired directional turning of both the direction of the propulsion motor of the trolling motor assembly and the direction of the transducer assembly of the sonar assembly, the processor may be further configured to generate the at least one first turning input signal to cause the steering actuator of the trolling motor assembly to cause the direction of the propulsion motor to rotate in a direction indicated by the user input and the directional actuator of the sonar assembly to cause the direction of the transducer assembly to rotate in the direction indicated by the user input such that both the direction of the propulsion motor and the direction of the transducer assembly rotate at a same speed of rotation.

In another example embodiment, a system is provided. The system includes a user input assembly, and the user input assembly is configured to receive a mode selection. The user input assembly is also configured to detect user activity related to at least one of either controlling a direction of a propulsion motor of a trolling motor assembly with a steering actuator or a direction of a transducer assembly of a sonar assembly with a directional actuator, and the directional actuator is configured to independently reorient with respect to the steering actuator of the trolling motor assembly. The system also includes a processor, and the processor is configured to receive user input via the user input assembly and determine whether the received user input corresponds to either (a) a desired directional turning of both the direction of the propulsion motor of the trolling motor assembly and the direction of the transducer assembly of the sonar assembly or (b) a desired independent directional turning of either the direction of the propulsion motor of the trolling motor assembly or the direction of the transducer assembly of the sonar assembly. In an instance in which the user input corresponds to (a) the desired directional turning of both the direction of the propulsion motor of the trolling motor assembly and the direction of the transducer assembly of the sonar assembly, the processor is configured to generate at least one first turning input signal to cause the steering actuator of the trolling motor assembly to cause the direction of the propulsion motor to adjust in a direction indicated by the user input and the directional actuator of the sonar assembly to cause the direction of the transducer assembly to adjust in the direction indicated by the user input such that both the direction of the propulsion motor and the direction of the transducer assembly adjust in the same direction and cause the at least one first turning input signal to be provided to the steering actuator to cause the adjustment of the direction of the propulsion motor and to be provided to the directional actuator to cause the adjustment of the direction of the transducer assembly. In an instance in which the desired user input corresponds to (b) the desired independent directional turning of either the direction of the propulsion motor of the trolling motor assembly or the direction of the transducer assembly of the sonar assembly, the processor is configured to determine whether the received user input corresponds to the desired independent directional turning of either (i) the direction of the propulsion motor of the trolling motor assembly or (ii) the direction of the transducer assembly of the sonar assembly. In an instance in which the user input corresponds to (i) the direction of the propulsion motor of the trolling motor assembly, the processor is configured to generate at least one second turning input signal to cause the steering actuator of the trolling motor assembly to cause the direction of the propulsion motor to adjust in a direction indicated by the user input such that the direction of the propulsion motor changes independent of the direction of the transducer assembly and cause the at least one second turning input signal to be provided to the steering actuator to cause the adjustment of the direction of the propulsion motor. In an instance in which the user input corresponds to (ii) the direction of the transducer assembly of the sonar assembly, the processor is configured to generate at least one third turning input signal to cause the directional actuator of the sonar assembly to cause the direction of the transducer assembly to adjust in the direction indicated by the user input such that the direction of the transducer assembly changes independent of the direction of the propulsion motor and cause the at least one third turning input signal to be provided to the directional actuator to cause the adjustment of the direction of the transducer assembly.

In another example embodiment, a system is provided. The system includes a trolling motor assembly including a propulsion motor and a steering actuator, and the steering actuator is configured to adjust a direction of the propulsion motor. The system also includes a sonar assembly including a transducer assembly and a directional actuator. The directional actuator is configured to adjust a direction of the transducer assembly, and the directional actuator is configured to independently reorient with respect to the steering actuator of the trolling motor assembly. The system also includes a user input assembly, and the user input assembly is configured to detect user activity related to at least one of either controlling the direction of the propulsion motor of the trolling motor assembly or the direction of the transducer assembly of the sonar assembly. The system also includes a processor. The processor is configured to receive user input via the user input assembly and determine an instance in which the user input corresponds to a desired directional turning of both the direction of the propulsion motor of the trolling motor assembly and the direction of the transducer assembly of the sonar assembly. In response thereto, the processor is configured to generate a first turning input signal to cause the steering actuator of the trolling motor assembly to cause the direction of the propulsion motor to adjust in a direction indicated by the user input such that the direction of the propulsion motor adjusts according to a first adjustment protocol that causes the propulsion motor to reorient toward a desired point of interest, generate a second turning input signal to cause the directional actuator of the sonar assembly to cause the direction of the transducer assembly to adjust in the direction indicated by the user input such that the direction of the transducer assembly adjusts according to a second adjustment protocol that causes the transducer assembly to point toward the desired point of interest, cause the first turning input signal to be provided to the steering actuator to cause the adjustment of the direction of the propulsion motor, and cause the second turning input signal to be provided to the directional actuator to cause the adjustment of the direction of the transducer assembly.

In some embodiments, the processor may be further configured to generate at least one correction signal to cause either the steering actuator of the trolling motor assembly to cause the direction of the propulsion motor to adjust or the directional actuator of the sonar assembly to cause the direction of the transducer assembly to adjust, such that the propulsion motor and the transducer assembly each faces in a same final direction after adjustment and cause the at least one correction signal to be provided to the steering actuator to cause the adjustment of the direction of the propulsion motor or to be provided to the directional actuator to cause the adjustment of the direction of the transducer assembly.

In some embodiments, the processor may be further configured to determine which of the propulsion motor and the transducer assembly faces in a direction that is farther from a neutral direction. In an instance in which the propulsion motor faces in a direction that is farther from the neutral direction, the processor may be configured to generate the at least one correction signal to cause the steering actuator of the trolling motor assembly to cause the direction of the propulsion motor to adjust, such that the propulsion motor and the transducer assembly each faces in the same direction after adjustment and cause the at least one correction signal to be provided to the steering actuator to cause the adjustment of the direction of the propulsion motor. In an instance in which the transducer assembly faces in a direction that is farther from the neutral direction, the processor may be configured to generate the at least one correction signal to cause the directional actuator of the sonar assembly to cause the direction of the transducer assembly to adjust, such that the propulsion motor and the transducer assembly each faces in the same direction after adjustment, and cause the at least one correction signal to be provided to the directional actuator to cause the adjustment of the direction of the transducer assembly.

In some embodiments, the processor may be further configured to generate at least one first correction signal to cause the steering actuator of the trolling motor assembly to cause the direction of the propulsion motor to adjust and at least one second correction signal to cause the directional actuator of the sonar assembly to cause the direction of the transducer assembly to adjust, such that the propulsion motor and the transducer assembly each faces in the same final direction after adjustment, and cause the at least one first correction signal to be provided to the steering actuator to cause the adjustment of the direction of the propulsion motor and the at least one second correction signal to be provided to the directional actuator to cause the adjustment of the direction of the transducer assembly.

In some embodiments, the first correction signal may include a first rate of turn, and the second correction signal may include a second rate of turn. The first rate of turn and second rate of turn may be configured such that the propulsion motor and the transducer assembly each faces in the same final direction at a same time.

BRIEF DESCRIPTION OF THE DRAWINGS

Figure 1:
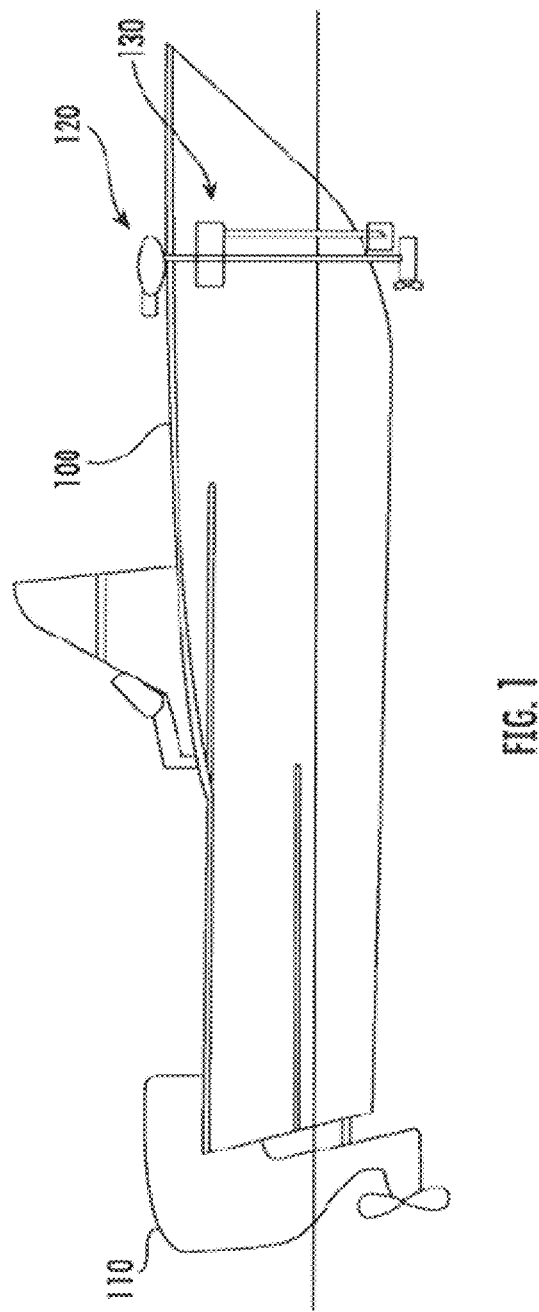
Figure 2:
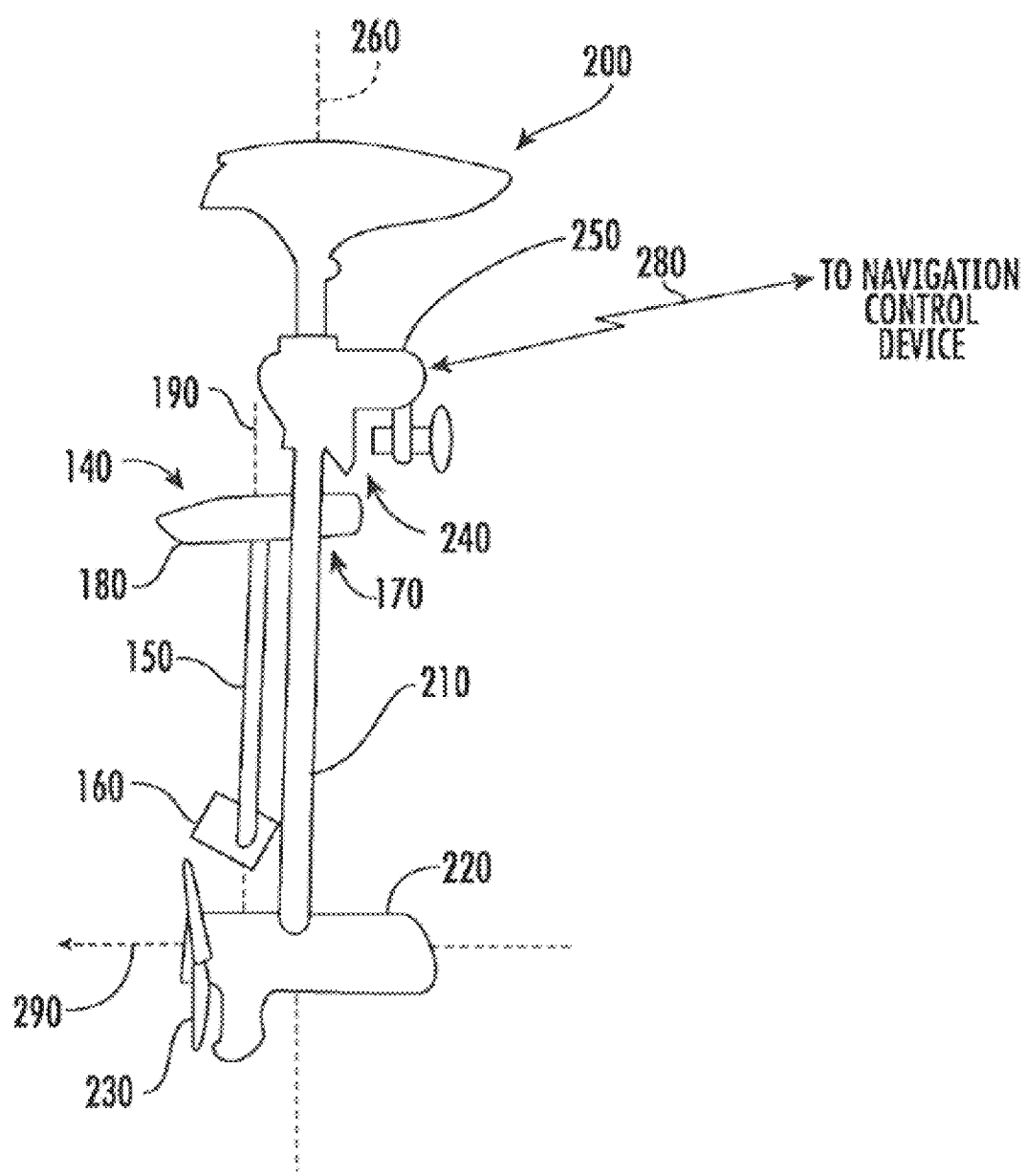
Figure 3:
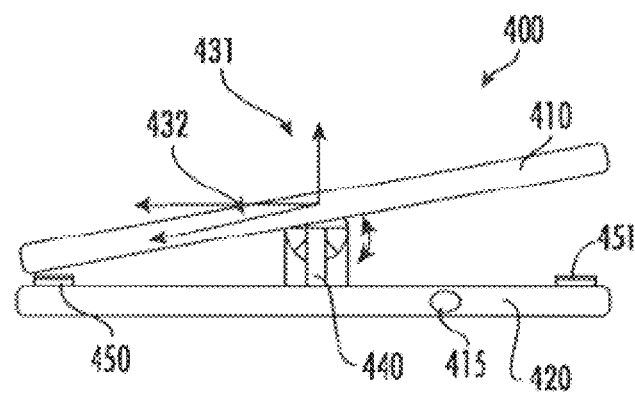
Figure 4A:
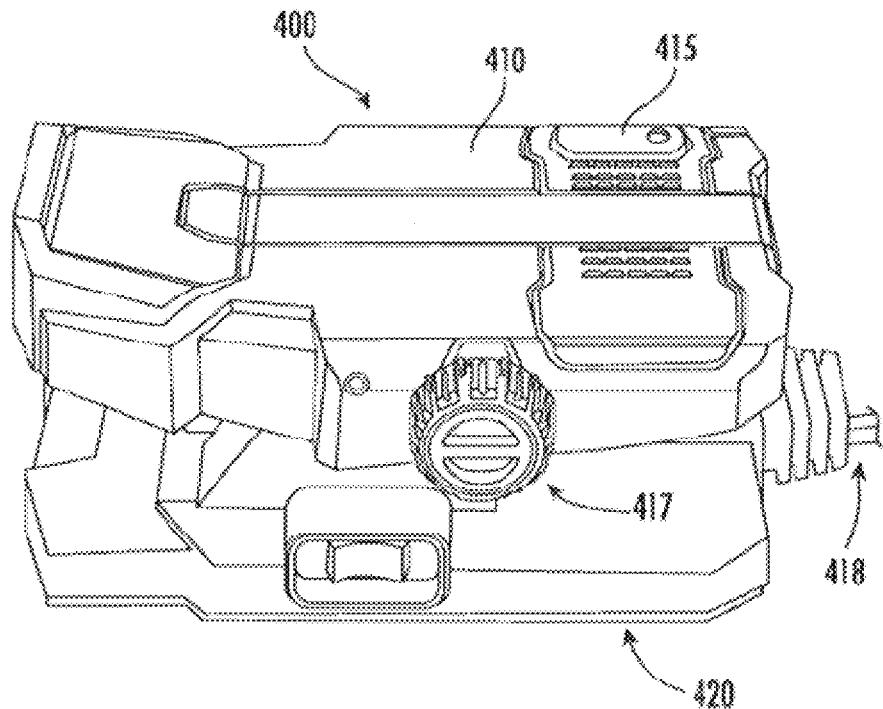
Figure 4B:
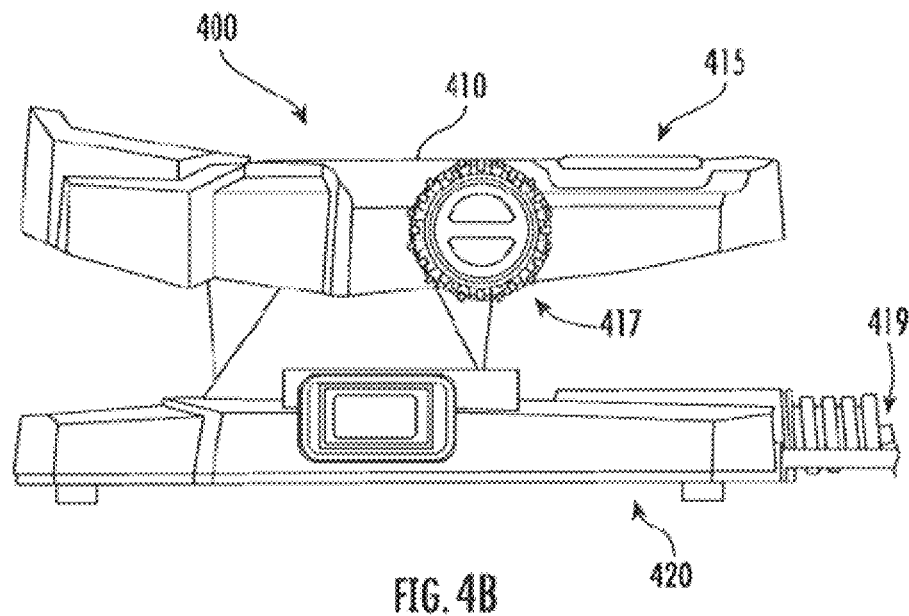
Figures 5A, 5B:
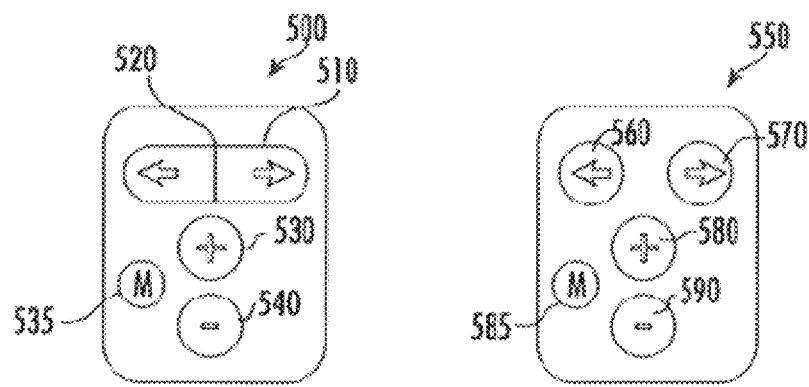
Figure 9:
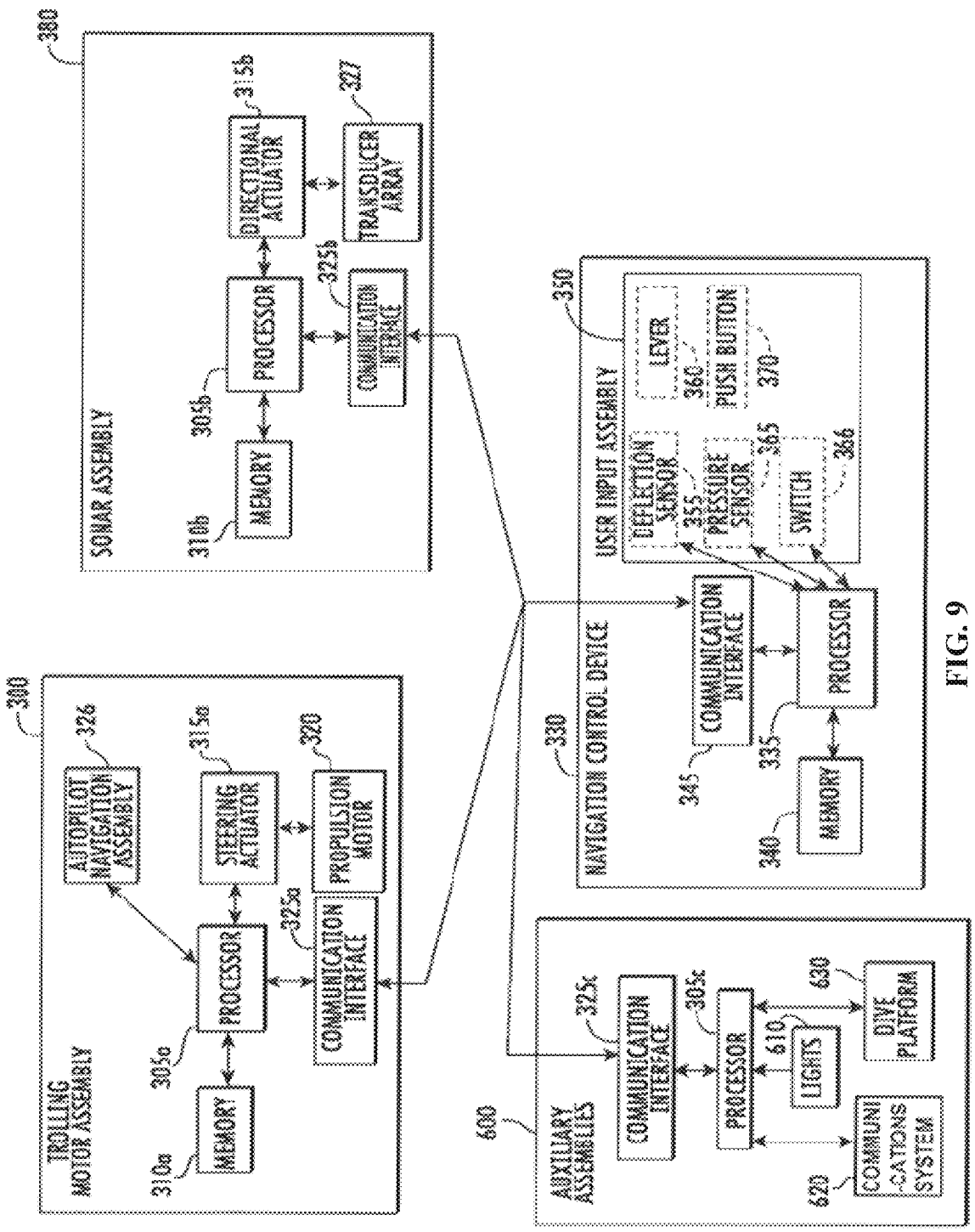
Figure 11B:
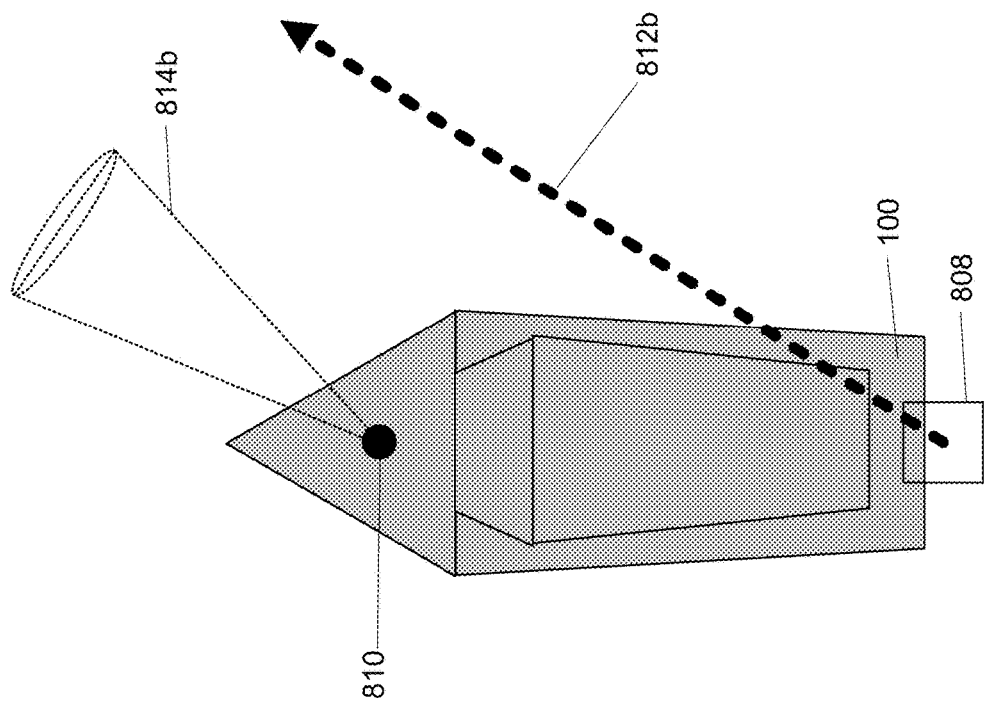
Figure 11A:
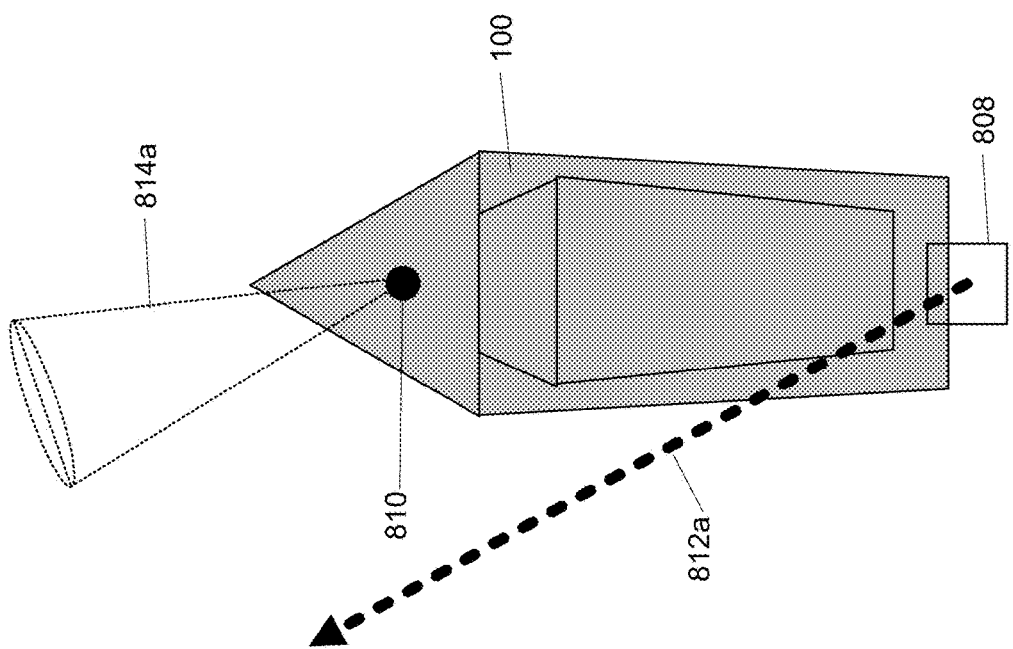
Figure 12B:
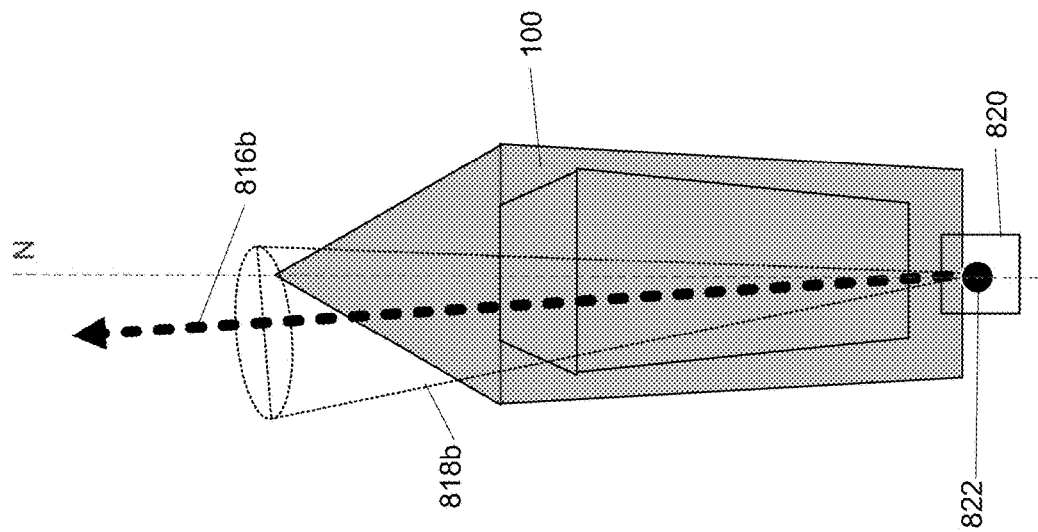
Figure 12A:
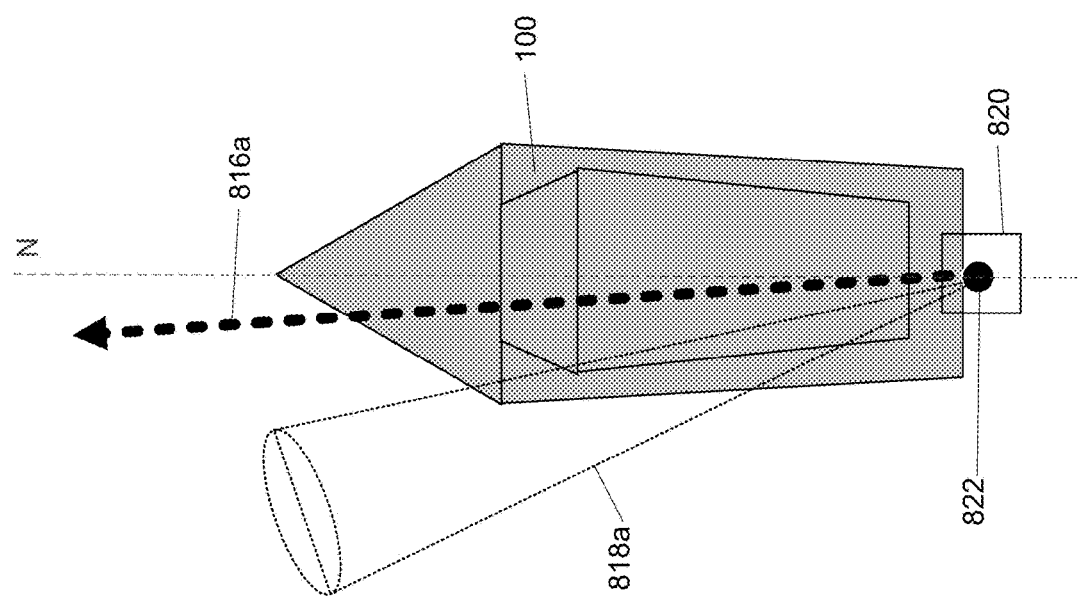
Figure 13B:
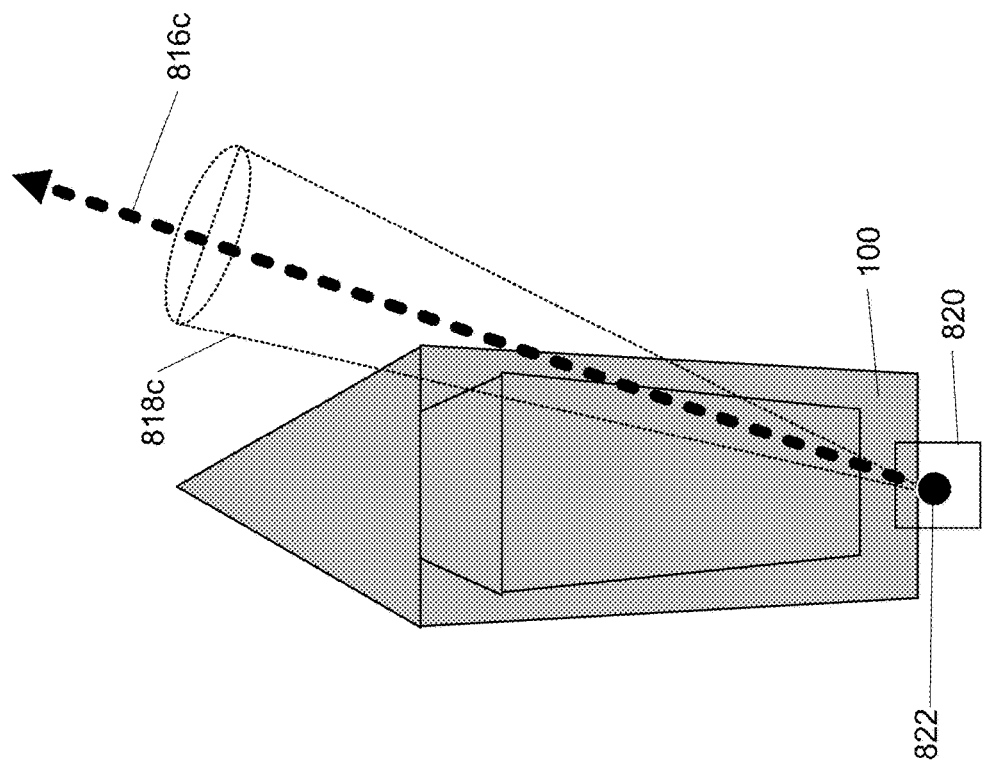
Figure 13A:
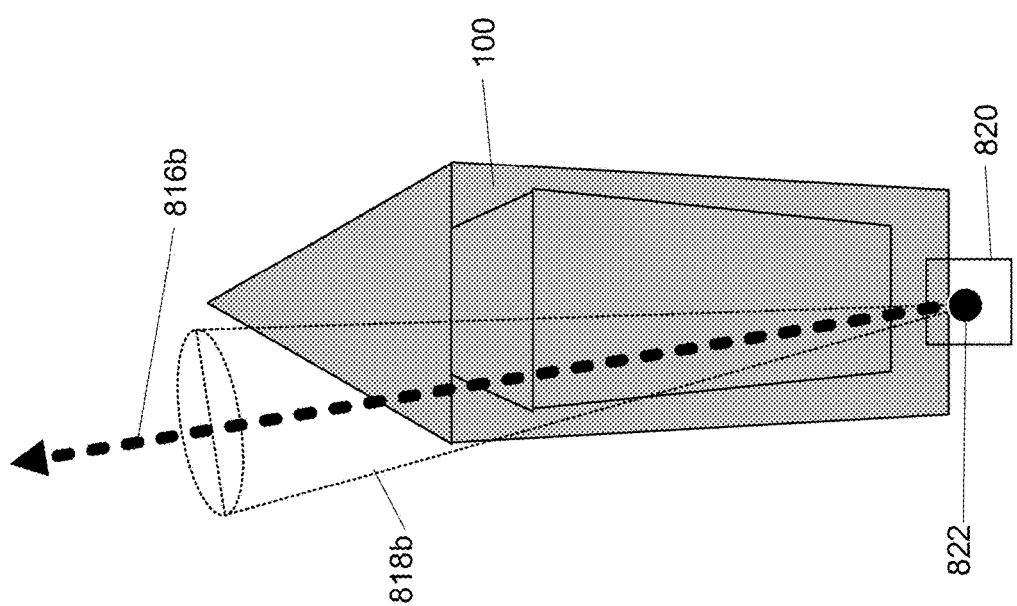
Figure 14B:
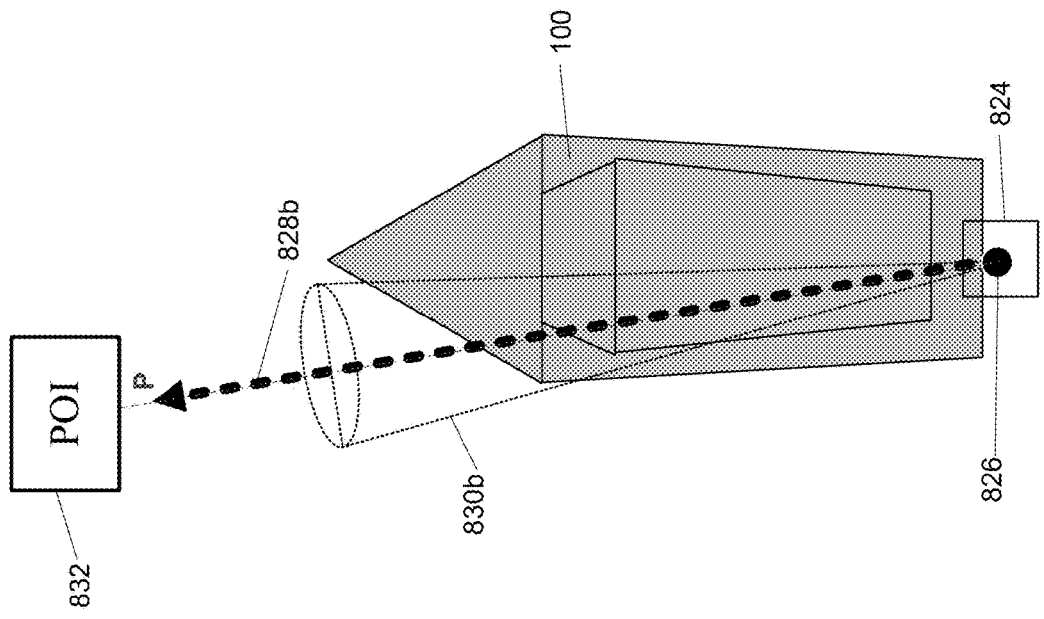
Figure 14A:
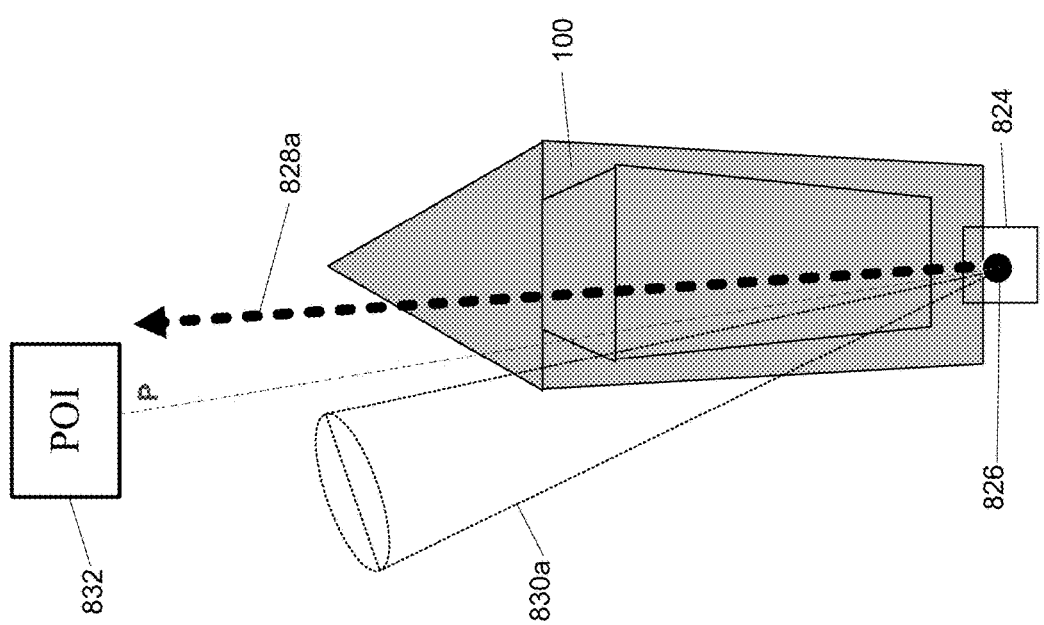
Figures 15A, 15B, 15C:
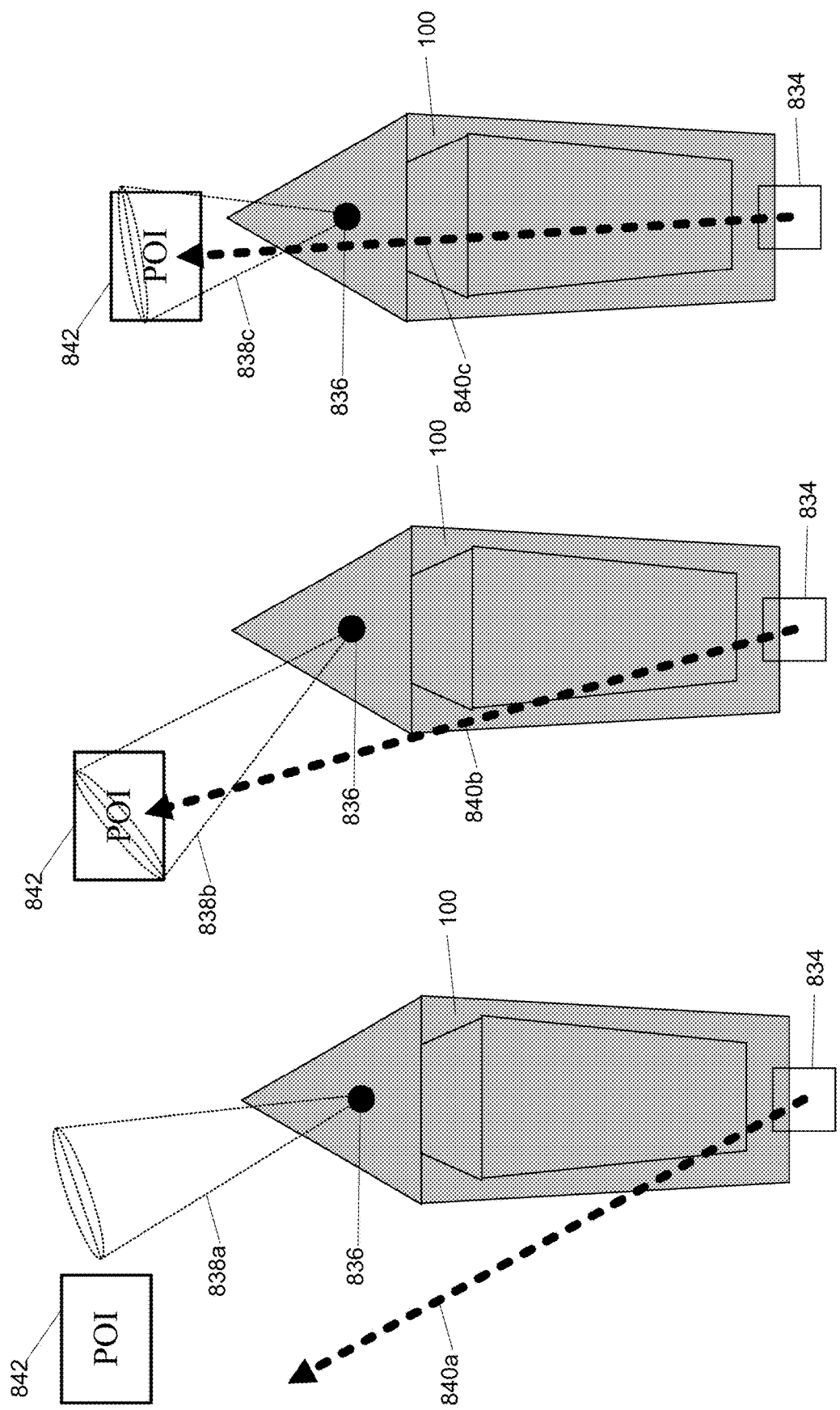
Figure 16:
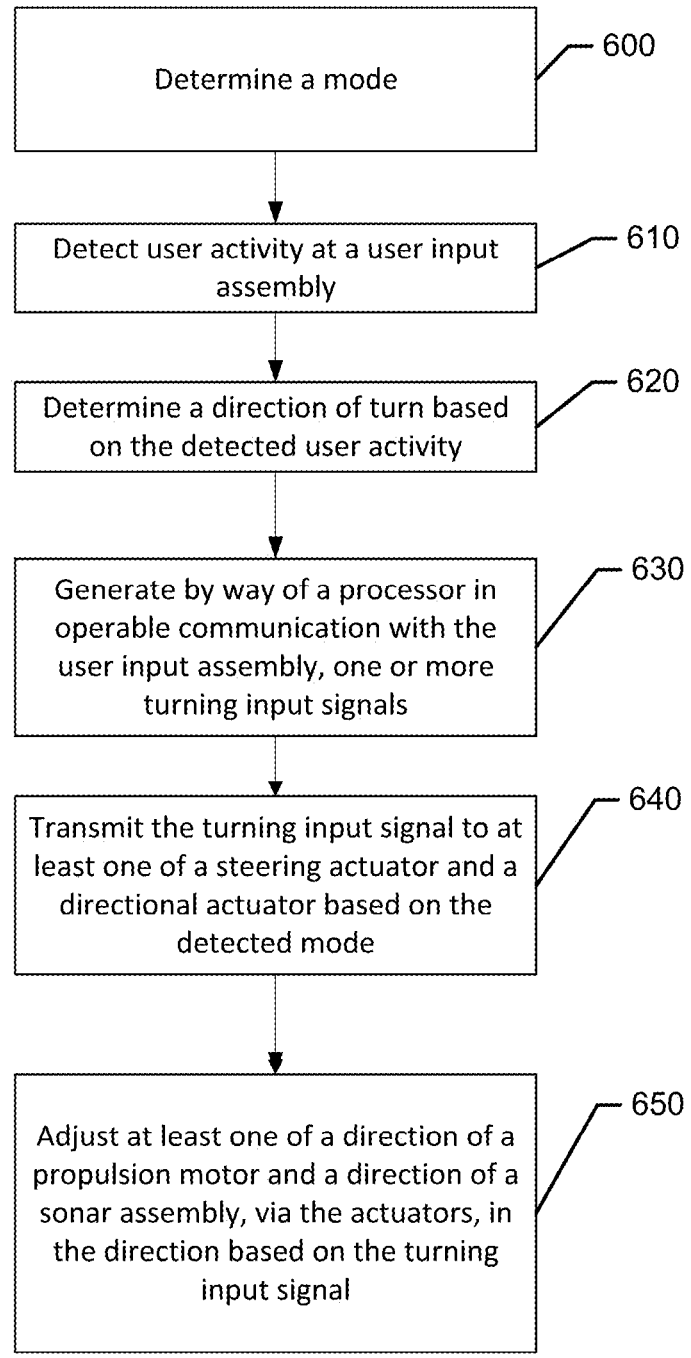
Figure 17:
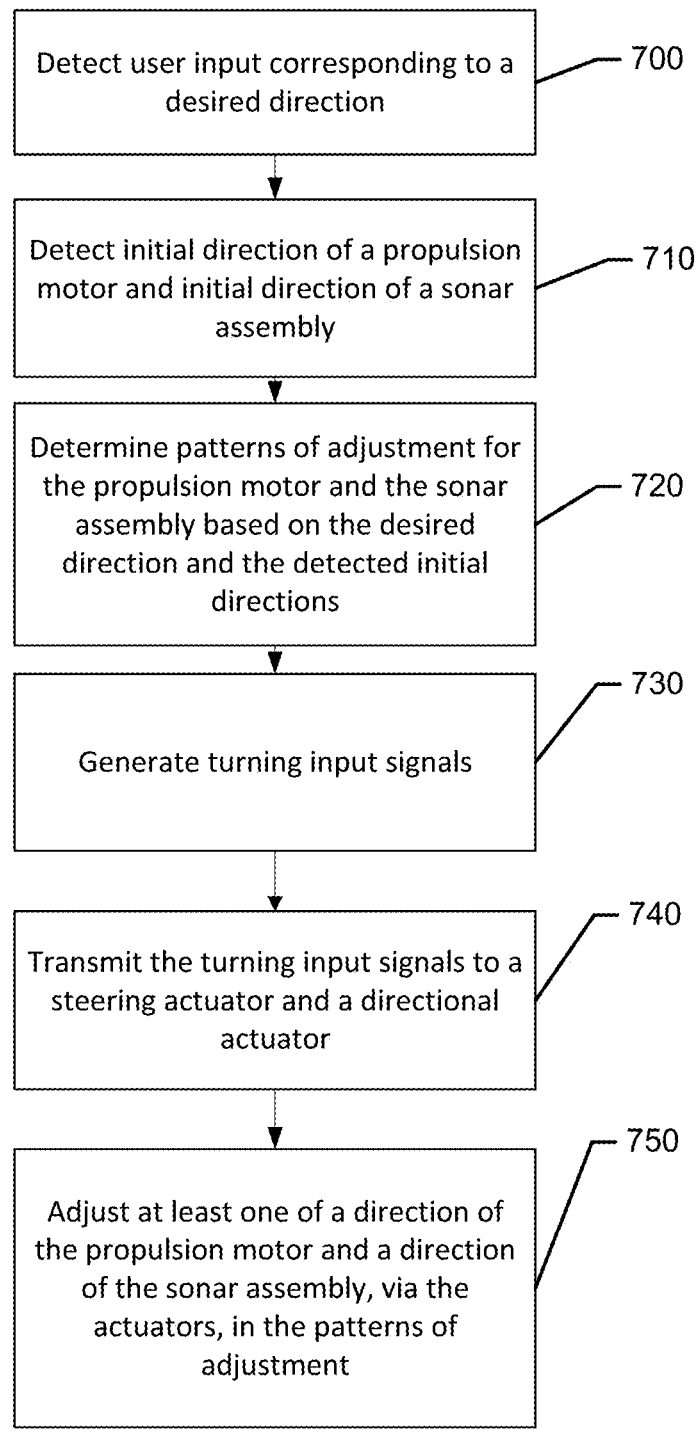

Having thus described some example embodiments in general terms, reference will now be made to the accompanying drawings, which are not necessarily drawn to scale, and wherein:

FIG. 1 shows an example watercraft with both a trolling motor assembly and a sonar assembly attached to the bow of the watercraft in accordance with some example embodiments;

FIG. 2 shows an example trolling motor assembly and sonar assembly in accordance with some example embodiments;

FIG. 3 shows an example navigation control device in the form of a foot pedal assembly in accordance with some example embodiments;

FIGS. 4A and 4B show an example navigation control device in the form of a foot pedal assembly in accordance with some example embodiments;

FIGS. 5A and 5B show example navigation control devices in the form of a remote control (e.g., fob) in accordance with some example embodiments;

FIGS. 6A and 6B show an example navigation control device in the form of a foot pedal providing control signals to an example trolling motor assembly attached to the bow of a watercraft in accordance with some example embodiments;

FIGS. 7A and 7B show an example navigation control device in the form of a foot pedal providing control signals to an example sonar assembly attached to the bow of a watercraft in accordance with some example embodiments;

FIGS. 8A and 8B show an example navigation control device in the form of a foot pedal providing control signals to an example sonar assembly and an example trolling motor assembly, which are attached to the bow of a watercraft, in accordance with some example embodiments;

FIG. 9 shows a block diagram of an example marine network architecture for various systems, apparatuses, and methods in accordance with some example embodiments;

FIGS. 10A and 10B show schematic top views of an example watercraft, illustrating control of both a trolling motor assembly and a sonar assembly in accordance with some example embodiments;

FIGS. 11A and 11B show schematic top views of another example watercraft, illustrating control of both a trolling motor assembly and a sonar assembly in accordance with some example embodiments;

FIGS. 12A and 12B show schematic top views of the example watercraft shown in FIGS. 10A-B, illustrating example correction control of a sonar assembly in accordance with some example embodiments;

FIGS. 13A and 13B show schematic top views of the example watercraft shown in FIGS. 12A-12B, illustrating control of both a trolling motor assembly and a sonar assembly in accordance with some example embodiments;

FIGS. 14A and 14B show schematic top views of the example watercraft shown in FIGS. 10A-B, illustrating example correction control of a trolling motor assembly and a sonar assembly in accordance with some example embodiments;

FIGS. 15A, 15B, and 15C show schematic top views of the example watercraft shown in FIGS. 11A-B, illustrating control of both a trolling motor assembly and a sonar assembly in accordance with some example embodiments;

FIG. 16 shows a flowchart of an example method for controlling operation of a trolling motor and a sonar assembly in accordance with some example embodiments; and FIG. 17 shows a flowchart of another example method for controlling operation of a trolling motor and a sonar assembly in accordance with some example embodiments.

DETAILED DESCRIPTION

Exemplary embodiments will be described more fully hereinafter with reference to the accompanying drawings, in which some, but not all embodiments of the invention are shown. Indeed, the embodiments take many different forms and should not be construed as being limiting. Rather, these example embodiments are provided so that this disclosure will satisfy applicable legal requirements. Like reference numerals refer to like elements throughout.

FIG. 1 illustrates an example watercraft 100 on a body of water. The watercraft 100 includes a main engine 110, a trolling motor system 120, and a sonar system 130. According to some example embodiments, the trolling motor system 120 may be comprised of a trolling motor assembly including a propulsion motor and a propeller, and a navigation control device (e.g., foot pedal, remote control, etc.) used to control the speed and the course or direction of propulsion. The trolling motor assembly may be attached to the bow of the watercraft 100 and the motor and propeller may be submerged in the body of water. However, positioning of the trolling motor system 120 need not be limited to the bow, and may be placed elsewhere on a watercraft. The trolling motor system 120 can be used to propel the watercraft 100 under certain circumstances, such as, when fishing and/or when wanting to remain in a particular location despite the effects of wind and currents on the watercraft 100. Depending on the design, the propeller of a trolling motor assembly may be driven by a gas-powered motor, an electric motor, or a hybrid motor. Moreover, steering the trolling motor system 120 may be accomplished manually via hand control, via foot control, or even through use of a remote-control (e.g., a fob). Additionally, in some cases, an autopilot may operate the trolling motor autonomously, such as when anchor mode is selected.

According to some sample embodiments, the sonar system 130 may be comprised of a sonar assembly including a directional actuator, a transducer assembly, and a navigational control device, such as the navigational control device that may be used to control the trolling motor system 120. The sonar system 130 may be attached to the trolling motor system 120 such that the transducer assembly is submerged in the body of water when the propeller is submerged. However, positioning of the sonar system 130 need not be limited to the trolling motor system 120, and may be placed elsewhere on the watercraft, such as directly to the bow, stern, or side, as shown in FIGS. 6A and 6B. The sonar system 130 can be used to detect waterborne or underwater objects. For example, the sonar system 130 may be used to determine depth and bottom topography, detect fish, etc.

FIG. 2 illustrates an example trolling motor assembly 200, as well as an example sonar assembly 140, according to some example embodiments. The trolling motor assembly 200 may include a shaft 210, a motor 220, a propeller 230, and an attachment device 240. The trolling motor assembly 200 may be affixed to a side of a watercraft via attachment device 240, which may be, for example, an adjustable clamp, mount, etc. According to some example embodiments, the trolling motor assembly 200 may also include other components such as, for example, lights, temperature sensors, etc.

Further, the trolling motor assembly may include a steering actuator 250 that is configured to actuate to cause rotation of the shaft 210, and accordingly rotation of the propeller 230, about axis 260 to change the facing direction (e.g., the direction of propulsion). To cause rotation and control of the direction of propulsion (or the direction the trolling motor is oriented, which may correspond to the direction of propulsion when the motor of the trolling motor is operating), the steering actuator 250 may directly rotate the shaft 210 or a series of cam shafts or gears may be employed to cause the rotation. The steering actuator 250 may be controlled via signals transmitted to the steering actuator, such as from a navigation control device via a wireless connection 280. In other example embodiments, a wired connection 419 (FIG. 4A) may be utilized to convey signals to the steering actuator 250.

Still referring to FIG. 2, the sonar assembly 140 may include a shaft 150, a transducer assembly 160 (e.g., one or more transducer elements or arrays), and an attachment device 170. The sonar assembly 140 may be affixed to either the shaft 210 of the trolling motor assembly 200 or directly to a side, bow, or stern of a watercraft via an attachment device 170, which may be, for example, an adjustable clamp, mount, etc. Further, the sonar assembly 140 may include a directional actuator 180 that is configured to actuate to cause rotation of the shaft 150, and accordingly rotation of the transducer array 160, about axis 190 to change the direction in which the transducer array 160 is directed with respect to the watercraft. To cause rotation and control of the orientation of the transducer array 160, the directional actuator 180 may directly rotate the shaft 160 on a series of cam shafts or gears may be employed to cause the rotation. The directional actuator 180 may be controlled via signals transmitted to the directional actuator 180 from a navigation control device, the same navigation control device that may be used to send signals to the steering actuator of the trolling motor assembly, such as via a wireless connection 280. In other example embodiments, a wired connection 419 (FIG. 4A) may be utilized to convey signals to the directional actuator 180. Notably, while rotation ability is shown for the sonar assembly 140 and the trolling motor assembly 200, other adjustment control is contemplated. For example, the sonar assembly 140 may be adjusted in angle (e.g., tilted up or down), in orientation (e.g., between viewing modes and/or according to a polar direction), or otherwise.

FIG. 3 shows an example implementation of a user input assembly of a navigation control device according to various example embodiments in the form of a foot pedal assembly 400. The foot pedal assembly 400 may be one example of a user input assembly that includes a deflection sensor and a lever. The foot pedal assembly 400 may be in operable communication with at least one of the trolling motor assembly 200 and the sonar assembly 140, via, for example, the processor as described with respect to FIG. 9. Foot pedal assembly 400 includes a lever 410 in the form of a foot pedal 431 that can pivot about an axis (as indicated by the arrows) in response to movement of, for example, a user's foot. The foot pedal assembly 400 further includes a support base 480 and a deflection sensor 440. The deflection sensor 440 may measure the deflection of the foot pedal 410 and provide an indication of the deflection to, for example, processor. A corresponding steering/directional input signal having an indication of a direction of turn (and, in some embodiments, a rate of turn) may be ultimately provided to one or more actuators (e.g., steering actuator 315a and/or directional actuator 315b of FIG. 9) via a wireless connection.

Additionally, the foot pedal assembly 400 preferably includes one or more control buttons, such as a button 415. In some embodiments, one or more buttons may be related to switching the foot pedal assembly 400 between at least a first mode in which the foot pedal assembly 400 provides control signals to the trolling motor assembly 200, a second mode in which control signals are provided to the sonar assembly 140, and a third mode in which the foot pedal assembly 400 provides control signals to both the trolling motor assembly 200 and the sonar assembly 140. As such, a user may switch between control of the trolling motor assembly 200, the sonar assembly 140, or both, with the foot pedal assembly 400 by simply operating the button 415 (e.g., turning it, depressing it or a portion of it, etc.). According to some example embodiments, additional modes of operation for the foot pedal assembly 400 may be selected (such as via one or more buttons) in which the foot pedal assembly 400 is used to provide control signals to auxiliary assemblies 600 (FIG. 9) of the corresponding watercraft such as, but not limited to, accent lighting 610, entertainment systems 620, dive platforms 630, etc. For example, such control signals may be used to dim/brighten accent lighting, raise/lower the volume of radios and televisions, extend/retract a dive platform, etc. In some embodiments, rather than the button 415, an alternate user input that could be toggled, moved, rotated, etc., could be used to select the mode of operation of the foot pedal assembly 400.

According to some example embodiments, the measured deflection of the foot pedal 410 may be an indication of the desired direction (and, in some embodiments, a desired rate of turn) for either the propulsion direction of the trolling motor assembly 200, the transmission direction of the sonar assembly 140, or both, depending upon the mode in which the user has placed the foot pedal assembly 400 of the navigation control device. In this regard, a user may cause the foot pedal 410 to rotate or deflect by an angle (according to example coordinate system 432) and the angle may be measured (e.g., in degrees) by the deflection sensor 440.

According to some example embodiments, when the above mentioned first mode is selected for the foot pedal assembly 400, rotation of the foot pedal 410 in the counterclockwise direction (such that the left side of the foot pedal 410 is tilted down), as shown in FIG. 6A, may cause the propulsion direction to turn to the left and, in some embodiments, at a desired rate of turn, while rotation of the foot pedal 410 in the clockwise direction (such that the right side of the foot pedal is tilted down), as shown in FIG. 6B, may cause the propulsion direction to turn to the right and, in some embodiments, at the desired rate of turn.

According to some example embodiments, when the above mentioned second mode is selected for the foot pedal assembly 400, rotation of the foot pedal 410 in the counterclockwise direction (such that the left side of the foot pedal is tilted down), as shown in FIG. 7A, may cause the orientation of the transducer assembly 160 of the sonar assembly 140, to turn to the left and, in some embodiments, at a desired rate of turn, while rotation of the foot pedal 410 in the clockwise direction (such that the right side of the foot pedal is tilted down), as shown in FIG. 7B, may cause the orientation of the transducer assembly 160, to turn to the right and, in some embodiments, at the desired rate of turn.

According to some example embodiments, when the above mentioned third mode is selected for the foot pedal assembly 400, rotation of the foot pedal 410 in the counterclockwise direction (such that the left side of the foot pedal is tilted down), as shown in FIG. 8A, may cause both the propulsion direction and the orientation of the transducer assembly 160 of the sonar assembly 140, to turn to the left and, in some embodiments, at a desired rate of turn, while rotation of the foot pedal 410 in the clockwise direction (such that the right side of the foot pedal is tilted down), as shown in FIG. 8B, may cause both the propulsion direction and the orientation of the transducer assembly 160, to turn to the right and, in some embodiments, at the desired rate of turn.

In some embodiments, the rate of turn may be a function of the magnitude of the angle measured by the deflection sensor 440. In this regard, for example, with each increase of an angle of deflection, the rate of turn may also increase proportionally based on a linear or exponential function. For example, if the foot pedal 410 is deflected by 5 degrees from a given origin, then the rate of turn may be 1 degree of rotation per second for the propulsion direction change. However, if the deflection angle is 10 degrees, the rate of turn may be 5 degrees of rotation per second for the propulsion direction change.

While the foot pedal assembly 400 is shown as including the foot pedal 410 to control the direction of rotation of the propulsion direction and the sonar assembly orientation, the foot pedal assembly 400 may also include other controls, such as related to determining the rate of turn for the trolling motor assembly 200 and the sonar assembly 140. For example, as shown in FIGS. 4A and 4B, propulsion speed controls, such as a speed wheel 417, may also be included on the foot pedal assembly 400. In such example embodiments, the speed wheel 417 may be utilized by a user to select a rate of turn rather than a rate of deflection or amount of deflection of the foot pedal, as previously discussed above. As shown, in some example embodiments, mode selector button 415 may be positioned on an upper surface of the foot pedal 410 to allow a user to switch modes of operation of the foot pedal assembly 400 with their foot.

FIG. 5A provides another example user input assembly that includes a deflection sensor and a lever. A fob 500 may be an embodiment of a user input assembly that includes, for example, the processor 335 described with respect to FIG. 9. The fob may include rocker button 510 that pivots about axis. The rocker button 510 may form the lever of some example embodiments and a deflection of the rocker button 510 may be measured by a deflection sensor (not shown). With respect to operation, a user may depress one side of the rocker button 510 to cause the rocker button 510 to deflect from its origin position. The angle of deflection may be measured by the deflection sensor and communicated to the processor as a direction and rate of turn. As described above, increases in the angle of deflection can result in increased rates of turn. Notably, while a rocker button is described above, other user input buttons may be utilized for providing instruction of desired directional control, such as a joystick, dial, other type buttons, display screen, etc.

The fob 500 also includes a mode select button 535 that, similarly to the above described button 415 of the foot pedal assembly 400, is used to control whether fob 500 provides control signals to either the trolling motor assembly 200, the sonar assembly 140, or both. Fob 500 may also include other controls, such as, a propulsion increase button 530 and propulsion decrease button 540. Propulsion increase button 530 and propulsion decrease button 540 may be operated to control the propulsion speed of a propulsion motor when providing control signals to the trolling motor assembly 200. Alternately, when providing control signals to the sonar assembly 140, increase button 530 and decrease button 540 may be used, for example, to adjust the angle of the transducer assembly 160 within a vertical plane.

According to some example embodiments, a change with respect to time in the angle of deflection may alternatively be used to indicate a desired rate of turn. In this regard, if a lever rapidly moves from, for example, an origin position to a given angle of deflection, then the rate of turn would be higher. For example, with respect to the foot pedal assembly 400, if a user was to stomp on the foot pedal 410 to generate a rapid change in the angle of deflection as measured by the deflection sensor 440 with respect to time, then a high rate of turn may be determined by the processor 335. Likewise, if a user slowly changes the angle of deflection, then the processor 335 may determine a lower rate of turn. In a similar fashion, the rate of change of the angle of the deflection of the rocker button 510 may be monitored to determine a rate of turn for provision to a steering actuator. As such, the processor 335 may be configured to determine a rate of turn based on the rate at which and angle of deflection changes with respect to time.

Referring again to FIG. 3, in some embodiments, the foot pedal 410 may include pressure sensors 450 and 451 (e.g., in combination with or as an alternative to deflection sensor 440). Accordingly, as a user depresses the foot pedal 410 onto one of the pressure sensors, a pressure (or force) may be applied to the sensor and the sensor may measure the pressure. If pressure is applied to sensor 450, then a rate of turn in a first direction may be determined, and if pressure is applied to sensor 451, then a rate of turn in the opposite direction may be determined.

In a similar manner, in some embodiments, rather than utilizing a rocker button 510, as shown in FIG. 5A, pressure sensors may be used in conjunction with a fob 550 to measure pressure in order to determine a rate of turn. Along these lines, the fob 550 shown in FIG. 5B may use pressure sensors to determine a direction and a rate of turn. In this regard, fob 550 may be similar to fob 500, with the exception that rather than a rocker button, two separate push buttons 560 and 570 may be included. One or more pressure sensors may be operably coupled to push buttons 560 and 570 to detect an amount of pressure being applied to the buttons. Again, a pressure value may be measured and used to determine both a direction and a rate of turn by the processor 335 (FIG. 9). Similar to fob 500, fob 550 may also include a mode select button 585, a propulsion/sonar/tilt increase button 580, and propulsion/sonar/tilt decrease button 590 to control the propulsion speed of the trolling motor assembly 200 or angle of transmission of the sonar assembly 140.

Referring again to FIG. 3, in some embodiments, instead of pressure sensors, sensors 450 and 451 may be switches. In such an example embodiment, as a user depresses the foot pedal 410 onto the switch, the switch may transition to an active state. Further, a user may hold the foot pedal 410 in that position for a duration of time. The duration of time may be measured and as it increases, the rate of turn may increase. In other words, holding the foot pedal 410 down longer can cause the rate of turn to increase. In a similar manner, switches may be used in conjunction with the fob 500 and a duration of time in an active state may be measured on either end of the rocker switch 510 to determine a rate of turn. Switches may also be used with fob 550, such as through buttons 560 and 570 in a similar manner.

While the above example embodiments utilize sensors that measure angle of deflection, pressure, and duration of time of pressing, some embodiments of the present invention contemplate other types of sensors for correlating to a desired rate of turn (e.g., capacitive, among others). Further, while the above example embodiments utilize a foot pedal or fob, some embodiments of the present invention contemplate use with other systems/structures, such as a touch screen, a user input assembly on the trolling motor or a remote marine electronics device.

FIG. 9 shows a block diagram of a trolling motor assembly 300 (similar to the trolling motor assembly 200), a sonar assembly 380 (similar to the sonar assembly 140) in communication with a navigation control device 330, and an auxiliary assembly 600. As described herein, it is contemplated that while certain components and functionalities of components may be shown and described as being part of the trolling motor assembly 300, the sonar assembly 380, or the navigation control device 330, according to some example embodiments, some components (e.g., the autopilot navigation assembly, functionalities of the processors 305a, 305b, and 335, or the like) may be included in the others of the trolling motor assembly 300, the sonar assembly 380, or the navigation control device 330.

As depicted in FIG. 9, the trolling motor assembly 300 may include a processor 305a, a memory 310a, a steering actuator 315a, a propulsion motor 320, and a communication interface 325a. According to some example embodiments, the trolling motor assembly 300 may also preferably include an autopilot navigation assembly 326. Also as depicted in FIG. 9, the sonar assembly 380 may include a processor 305b, a memory 310b, a directional actuator 315b, a communications interference 325b, and a transducer array 327. As well, the auxiliary assembly 600 may include a processor 305c, communications interference 325c, lighting 610, a communications system 620, a dive platform 630, etc.

The processors 305a, 305b, and 350c may be any means configured to execute various programmed operations or instructions stored in a memory device such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processors 305a, 305b, and 305c as described herein. In this regard, the processor 305a may be configured to analyze electrical signals communicated thereto, for example in the form of a steering input signal received via the corresponding communication interface 325a, and instruct the steering actuator 315a to adjust the direction of the propulsion motor 320 in accordance with a received direction and rate of turn. Alternatively, subsequently, or simultaneously, the processor 305b may be configured to analyze electrical signals communicated thereto in the form of a directional input signal and instruct the directional actuator 315b to adjust the direction of the transducer array 327 in accordance with a received rotational signal. Processor 305c may be configured to analyze electrical signals communicated thereto in the form of control signals for the various associated systems, i.e., lights 610, entertainment system 620, etc., and operate the associated systems in accordance with the received control signals.

The memories 310a and 310b may be configured to store instructions, computer program code, trolling motor and/or sonar steering codes and instructions, marine data, such as sonar data, chart data, location/position data, and other data in a non-transitory computer readable medium for use, such as by the processors 305a and 305b.

The communication interfaces 325a and 325b may be configured to enable connection to external systems (e.g., trolling motor assembly 300 and sonar assembly 380). In this manner, the processors 305a and 305b may retrieve stored data from remote, external servers via their communication interfaces 325a and 325b in addition to or as an alternative to their memories 310a and 310b, respectively.

The processor 305a of trolling motor assembly 300 may be in communication with and control the steering actuator 315a. Steering actuator 315a may be an electronically controlled mechanical actuator (i.e., an electro-mechanical actuator) configured to actuate at various rates (or speeds) in response to respective signals or instructions. As described above with respect to steering actuator 250 (FIG. 2), steering actuator 315a may be configured to adjust the direction of the propulsion motor 320, a rudder, and/or propulsion, regardless of the means for doing so, in response to electrical signals. To do so, steering actuator 315a may employ a solenoid, a motor, or the like configured to convert an electrical signal into a mechanical movement. The range of motion to turn the propulsion motor 320 may be more than 360 degrees, 360 degrees, 180 degrees, 90 degrees, 37 degrees, or the like. Further, with respect to being variable speed, the steering actuator 315a may be configured to receive a signal that indicates a rate of turn for the propulsion motor 320 (e.g., 10 degrees/second, 5 degrees/second, or the like) and actuate at a respective rate to support the desired rate of turn for the propulsion direction.

The propulsion motor 320 may be any type of propulsion device configured to urge a watercraft through the water (e.g., trolling motor, main propulsion motor, thruster, etc.). The propulsion motor 320 may be variable speed to enable the propulsion motor 320 to move the watercraft at different speeds or with different power or thrust.

Similarly, the processor 305b of the sonar assembly 380 may be in communication with and control the directional actuator 315b. Directional actuator 315b may be an electronically controlled mechanical actuator (i.e., an electro-mechanical actuator) configured to actuate at various rates (or speeds) in response to respective signals or instructions. As described above with respect to directional actuator 180 (FIG. 2), directional actuator 315b may be configured to adjust the rotation direction or height of the shaft and/or the orientation and/or height of the transducer array 327 (which could be multiple transducer arrays, as well as a single transducer element), regardless of the means for doing so, in response to electrical signals. To do so, directional actuator 315b may employ a solenoid, a motor, or the like configured to convert an electrical signal into a mechanical movement. The range of motion to turn the transducer array 327 may be more than 360 degrees, 360 degrees, 180 degrees, 90 degrees, 37 degrees, or the like. Further, with respect to being variable speed, the directional actuator 315b may be configured to receive a signal that indicates a rate of turn for the transducer assembly 327 (e.g., 10 degrees/second, 5 degrees/second, or the like) and actuate at a respective rate to support the desired rate of turn for the transmission direction.

The sonar assembly 380 may include a sonar transducer array 327 (which could be multiple transducer arrays, as well as a single transducer element) that may be affixed to a component of the trolling motor assembly 300, such as the shaft 210 (FIG. 2), such that is disposed underwater when the trolling motor assembly 300 is operating. In this regard, the transducer array 327 may be in a housing and configured to gather sonar data from the underwater environment surrounding the watercraft. Accordingly, the processor 305b (such as through execution of computer program code) may be configured to receive sonar data from the transducer array 327, and process the sonar data to generate an image based on the gathered sonar data. In some example embodiments, the sonar assembly 380 may be used to determine depth and bottom topography, detect fish, locate wreckage, etc. Sonar beams, from the sonar transducer 327, can be transmitted into the underwater environment and echoes can be detected to obtain information about the environment. In this regard, the sonar signals can reflect off objects in the underwater environment (e.g., fish, structures, sea floor bottom, etc.) and return to the transducer, which converts the sonar returns into sonar data that can be used to produce an image of the underwater environment. According to some example embodiments, the sonar assembly 380 may include or be in communication with a display to render the image for display to a user.

Based on the input received by the user input assembly 350, the system may be configured to selectively control the trolling motor assembly 300, the sonar assembly 380, or both the trolling motor assembly 300 and the sonar assembly 380. When only one of the trolling motor assembly 300 or the sonar assembly 380 is selected, the system may not have control over the unselected assembly while the selected assembly is controlled. When both the trolling motor assembly 300 and the sonar assembly 380 are selected, however, the system may be configured to allow control over both the trolling motor assembly 300 and the sonar assembly 380 in various different ways.

For example, FIGS. 10A-10B show an example scenario in which a trolling motor assembly 800 and a sonar assembly 802 are attached together, and in which a user has indicated a desire for control over both the trolling motor assembly 800 and the sonar assembly 802 (e.g., through user input assembly 350). When the user indicates a desired direction of turn using, e.g., a foot pedal and/or a fob, etc., the processor 335 may generate and send signals to both the trolling motor assembly 800 and the sonar assembly 802, causing the propulsion motor and the transducer assembly to move in the same direction. In some embodiments, both the propulsion motor and the transducer assembly may move at the same time (e.g., such that they move simultaneously). Further, in some embodiments, both the propulsion motor and the transducer assembly may move at the same rate and in the same direction (e.g., such that they move synchronously). For example, in the illustration of FIG. 10A, the beam 806a represents an initial facing direction of the transducer assembly of the sonar assembly 802, and the arrow 804a represents an initial facing direction of the propulsion motor of the trolling motor assembly 800. In the illustration of FIG. 10B, the beam 806b represents a subsequent facing direction of the transducer assembly of the sonar assembly 802, and the arrow 804b represents a subsequent facing direction of the propulsion motor of the trolling motor assembly 800. Notably, the angle A1, which is the angle between the beam 806a and the arrow 804a, is equal to the angle A2, which is the angle between the beam 806b and the arrow 804b. In some embodiments in which synchronous movement is desired, the angle A1 may be equal to the angle A2, as depicted in FIGS. 10A-10B. In other embodiments, the processor 335 may be configured to cause the propulsion motor and the transducer array to move in the same direction but at different rates, and the angles A1 and A2 may not be the same.

FIGS. 11A-11B show another example scenario in which a user has indicated a desire for control over both a trolling motor assembly 808 and a sonar assembly 810 (e.g., through user input assembly 350). In this example embodiment, however, the trolling motor assembly 808 and the sonar assembly 810 are not attached. Instead, the trolling motor assembly 808 is near the stern of the watercraft 100, and the sonar assembly 810 is near the bow of the watercraft 100. In this embodiment, when the user indicates a desired direction of turn using, e.g., a foot pedal and/or a fob, etc., the processor 335 may generate and send signals to both the trolling motor assembly 808 and the sonar assembly 810, causing the propulsion motor and the transducer array to move in the same direction. For example, in the illustration of FIG. 11A, the beam 814a represents an initial facing direction of the transducer assembly of the sonar assembly 810, and the arrow 812a represents an initial facing direction of the propulsion motor of the trolling motor assembly 808. In the illustration of FIG. 10B, the beam 814b represents a subsequent facing direction of the transducer assembly of the sonar assembly 810, and the arrow 812b represents a subsequent facing direction of the propulsion motor of the trolling motor assembly 808. In some embodiments, both the propulsion motor and the transducer assembly may move at the same time (e.g., such that they move simultaneously). Further, in some embodiments, both the propulsion motor and the transducer assembly may move at the same rate (e.g., such that they move synchronously). In other embodiments, the propulsion motor and the transducer array may not move at the same rate.

In some embodiments, the processor 335 may be configured to generate a correction signal before or in conjunction with causing movement of both a propulsion motor and a transducer assembly. For example, FIG. 12A shows a trolling motor assembly 820 and a sonar assembly 822 which are facing in different directions, as illustrated by beam 818a and arrow 816a. The processor 335 may be configured to determine which of the propulsion motor and the transducer assembly faces in a direction that is farther from, e.g., a neutral position N (e.g., the watercraft north, although any direction may be used). For example, the processor 335 may determine whether the beam 818a or the arrow 816a is closer to the neutral position N. The processor 335 may then be configured to generate a correction signal for the assembly that is farther from the neutral position N. For example, in FIG. 12A, the beam 818a is farther from the neutral position N than is the arrow 816a. Thus, the processor 335 may be configured to generate a correction signal to be provided to the sonar assembly 822 to cause the rotation of the direction of the transducer assembly such that, after rotation, the transducer assembly faces in the same direction as the propulsion motor, as shown in FIG. 12B (e.g., such that the beam 818b and the arrow 816b face in the same direction). The reverse may also be true. For example, if the arrow 816a were farther from the neutral position N than the beam 818a, the processor 335 may be configured to generate a correction signal to be provided to the trolling motor assembly 820 to cause the rotation of the direction of the propulsion motor such that, after rotation, the transducer assembly faces in the same direction as the propulsion motor (e.g., such that the beam 818b and the arrow 816b face in the same direction). In some embodiments, the neutral position N may be as depicted in FIGS. 12A-12B, which is in a fore-to-aft direction of the watercraft 100. In other embodiments, the neutral position N may be any other position with respect to the watercraft 100.

In some embodiments, the processor 335 may be configured to generate two correction signals. For example, the processor 335 may be configured to generate a first correction signal to be sent to the trolling motor assembly 820, and a second correction signal to be sent to the sonar assembly 822, such that propulsion motor and the transducer assembly both move such that they face in the same way as the neutral position N (e.g., such that both the beam 818a and the arrow 816a move to be in line with the neutral position N). In some embodiments, the neutral position N may be as depicted in FIGS. 12A-12B, which is in a fore-to-aft direction of the watercraft 100, or in other embodiments, the neutral position N may be any other position with respect to the watercraft 100. Further, in other embodiments, the processor 335 may be configured to generate multiple correction signals to achieve any other position before or during controlled movement of both a propulsion motor and a transducer assembly begins.

In embodiments in which multiple correction signals are generated, the first correction signal may include a first rate of turn, and the second correction signal may include a second rate of turn. In some embodiments, the first rate of turn and the second rate of turn may be configured such that the propulsion motor and the transducer assembly each face in the same final direction at a same time. In other embodiments, the first rate of turn and the second rate of turn may be the same, such that the propulsion motor and the transducer assembly each face in the same final direction, but such that each of the propulsion motor and the transducer assembly reach their final position at different times.

Once one or more correction signals have been executed, and still while the user has indicated a desire for control over both the trolling motor assembly 820 and the sonar assembly 822, the trolling motor assembly 820 and the sonar assembly 822 may operate according to the configuration shown in FIGS. 13A-13B. That is, the illustration in FIG. 13A may depict the trolling motor assembly 820 and the sonar assembly 822 after one or more correction signals have been generated, such that the propulsion motor and the transducer assembly face in the same direction (e.g., such that the beam 818b and the arrow 816b are parallel). When the user indicates a desired direction of turn using, e.g., a foot pedal and/or a fob, etc., the processor 335 may generate and send signals to both the trolling motor assembly 820 and the sonar assembly 822, causing the propulsion motor and the transducer assembly to move in the same direction. For example, in the illustration of FIG. 13A, the beam 818b represents an initial facing direction of the transducer assembly of the sonar assembly 822, and the arrow 816b represents an initial facing direction of the propulsion motor of the trolling motor assembly 820. In the illustration of FIG. 13B, the beam 818c represents a subsequent facing direction of the transducer assembly of the sonar assembly 822, and the arrow 816c represents a subsequent facing direction of the propulsion motor of the trolling motor assembly 820. In some embodiments, both the propulsion motor and the transducer assembly may move at the same time (e.g., such that they move simultaneously). Further, in some embodiments, such as shown in FIGS. 13A-13B, both the propulsion motor and the transducer assembly may move at the same rate (e.g., such that they move synchronously). In other embodiments, the propulsion motor and the transducer assembly may not move at the same rate. Further, in some embodiments, the trolling motor assembly 820 and the sonar assembly 822 may be attached, such as shown in FIGS. 13A-13B. In some embodiments, however, the trolling motor assembly 820 and the sonar assembly 822 may not be attached and may be located at different locations with respect to the watercraft 100.

As another example, the processor 335 may be configured to generate one or more correction signals according to a selected point of interest 832. For example, as shown in FIGS. 14A-14B, the processor 335 may generate a first correction signal to be sent to the trolling motor assembly 824 and a second correction signal to be sent to the sonar assembly 826, such that both the propulsion motor and the transducer assembly adjust to aim to, e.g., the position P. For example, the neutral position P may be determined based on a point of interest 832, which may be selected by the user. The correction signals may be generated based on the point of interest 832 such that the beam 830a and the arrow 828a, which represent the initial directions of the transducer assembly and the propulsion motor, respectively, move to be in line with the position P, as depicted in FIG. 14B (e.g., the beam 830b and the arrow 828b are in line with position P).

In embodiments in which multiple correction signals are generated according to a selected point of interest (e.g., point of interest 832), the first correction signal may include a first rate of turn, and the second correction signal may include a second rate of turn. In some embodiments, the first rate of turn and the second rate of turn may be configured such that the propulsion motor and the transducer assembly each face in the same final direction (e.g., towards the point of interest 832) at a same time. In other embodiments, the first rate of turn and the second rate of turn may be the same, such that the propulsion motor and the transducer assembly each face in the same final direction, but such that each of the propulsion motor and the transducer assembly reach their final direction at different times.

According to some example embodiments, the autopilot navigation assembly 326 (depicted in FIG. 9) may be configured to determine a destination (e.g., via input by a user) and route for a watercraft and control the steering actuator 315a, via the processor 305a, to steer the propulsion motor 320 in accordance with the route and destination independent of any input from a user, such as by way of the navigation control device 330. In this regard, the processor 305a and memory 310a may be considered components of the autopilot navigation assembly 326 to perform its functionality, but the autopilot navigation assembly 326 may also include position sensors. The memory 310a may store digitized charts and maps to assist with autopilot navigation. To determine a destination and route for a watercraft, the autopilot navigation assembly 326 may employ a position sensor, such as, for example, a global positioning system (GPS) sensor. Based on the route, the autopilot navigation assembly 326 may determine that different rates of turn for propulsion may be needed to efficiently move along the route to the destination. As such, the autopilot navigation assembly 326 may instruct the steering actuator 315a, via the processor 305a, to turn in accordance with different rates of turn as defined in a planned route. According to some example embodiments, a rate of turn during a route may be a function of, for example, the prevailing winds, ocean currents, weather considerations, or the like at the location of the turn. As well, the autopilot navigation assembly 326 may be configured to maintain a watercraft in a desired location (e.g., when a user selects an "anchor mode") by controlling the steering actuator 315a, via the processor 305a, to steer the propulsion motor 320 based on inputs from the aforementioned GPS sensor.

In some embodiments, utilization of the autopilot navigation assembly 326 to autonomously steer the propulsion motor 320 of the watercraft allows a user to selectively provide control signals to an alternate system, such as the sonar assembly 380, by selecting the corresponding mode of operation of the navigation control device 330. Further, in some embodiments, utilization of the autopilot navigation assembly 326 to autonomously steer the propulsion motor 320 of the watercraft allows a user to select a mode indicating a desire for control over both the trolling motor assembly 300 and the sonar assembly 380, in which the transducer array 327 moves autonomously with the propulsion motor 320 according to the instructions from the autopilot navigation assembly 326.

In some embodiments, with reference to FIGS. 15A-15C, the processor 335 may be configured to facilitate movement of both the propulsion motor and the transducer assembly in a different way, such as according to a point of interest 842.

For example, the processor 335 may be configured to generate and send a turning input signal to the trolling motor assembly 834 to cause the direction of the propulsion motor to rotate in a pattern that causes the propulsion motor to move toward the point of interest 842 for a desired period of time (e.g., the propulsion motor moves to aim toward the point of interest 842, as shown by the arrows 840a and 840b in FIGS. 15A-15B). Further, as the watercraft 100 moves with respect to the point of interest 842, the processor 335 may be configured to generate and send more turning input signals to the trolling motor assembly 834 to cause the direction of the propulsion motor to rotate in a pattern that causes the direction of the propulsion motor to continue to adjust toward the point of interest 842 for the desired period of time (e.g., the propulsion motor continues to move to aim toward the point of interest 842, as shown by the arrows 840b and 840c in FIGS. 15B-15C). Similarly, the processor 335 may be configured to generate and send a turning input signal to the sonar assembly 836 to cause the direction of the transducer assembly to rotate in a pattern that causes the transducer assembly to aim toward the point of interest 842 for a desired period of time (e.g., the transducer assembly moves to aim toward the point of interest 842, as shown by the beams 838a and 838b in FIGS. 15A-15B). Further, as the watercraft 100 moves with respect to the point of interest 842, the processor 335 may be configured to generate and send more turning input signals to the sonar assembly 836 to cause the direction of the transducer assembly to adjust in a pattern that causes the transducer assembly to continue to aim toward the point of interest 842 for the desired period of time (e.g., the transducer array continues to move to aim toward the point of interest 842, as shown by the beams 838b and 838c in FIGS. 15B-15C).

In embodiments in which the processor 335 is configured to generate and send turning input signals to the trolling motor assembly 834 and to the sonar assembly 836 to cause the directions of the propulsion motor and the transducer assembly to adjust direction in patterns that cause the propulsion motor and the transducer assembly to move toward the point of interest 842 for a desired period of time, the processor 335 may also be configured to generate one or more correction signals, as described herein, e.g., with respect to FIGS. 12A-12B and 14A-14B.

As mentioned above, the trolling motor assembly 300 and sonar assembly 380 may be in communication with a navigation control device 330 that is configured to selectively control the operation of either the trolling motor assembly 300, the sonar assembly 380, or both. In this regard, the navigation control device 330 may include a processor 335, a memory 340, a communication interface 345, and a user input assembly 350.

The processor 335 may be any means configured to execute various programmed operations or instructions stored in a memory device, such as a device or circuitry operating in accordance with software or otherwise embodied in hardware, or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 335 as described herein. In this regard, the processor 335 may be configured to analyze signals from the user input assembly 350 and convey the signals or variants of the signals, such as via the communication interface 345, to either the trolling motor assembly 300 or the sonar assembly 380.

The memory 340 may be configured to store instructions, computer program code, trolling motor or sonar steering codes and instructions, marine data, such as sonar data, chart data, location/position data, and other data in a non-transitory computer readable medium for use, such as by the processor 335.

The communication interface 345 may be configured to enable connection to external systems (e.g., communication interfaces 325a and 325b). In this manner, the processor 335 may retrieve stored data from a remote, external server via the communication interface 345 in addition to, or as an alternative to, the memory 340.

Communication interfaces 325a, 325b, and 345 may be configured to communicate via a number of different communication protocols and layers. For example, the link between the communication interfaces 325a and 325b, and communication interface 345 may be any type of wireless communication link. For example, communications between the interfaces may be conducted via Bluetooth, Ethernet, the NMEA 2000 framework, cellular, WiFi, or other suitable networks.

According to various example embodiments, the processor 335 may operate on behalf of the trolling motor assembly 300, the sonar assembly 380, and the navigation control device 330. In this regard, the processor 335 may be configured to perform some or all of the functions described with respect to processors 305a and 305b, and processor 335 may communicate directly to the autopilot navigation assembly 326, the steering actuator 315a, or the directional actuator 315b directly via a wireless communication.

The processor 335 may also interface with the user input assembly 350 to obtain information including a direction and/or a rate of turn for either the trolling motor assembly 300, the sonar assembly 380, or both, based on user activity that are one or more inputs to the user input assembly 350. In this regard, the processor 335 may be configured to determine the direction and rate of turn based on user activity detected by the user input assembly 350 and generate one or more steering/directional input signals. The steering/directional input signal may be an electrical signal indicating the direction of turn. Further, the processor 335 may be configured to direct the steering actuator 315a and/or the directional actuator 315b, directly or indirectly, to rotate the propulsion motor 320 and/or the transducer array 327, respectively, at a desired rate of turn based on the rate of turn indicated in the input signal. According to some example embodiments, the processor 335 may be further configured to modify the rate of turn indicated in the steering and/or directional input signal to different values based on variations in the user activity detected by the user input assembly 350.

Various example embodiments of a user input assembly 350 may be utilized to detect the user activity and facilitate generation of one or more steering input signals indicating a rate of turn. To do so, various sensors including feedback sensors, and mechanical devices that interface with the sensors, may be utilized. For example, a deflection sensor 355, a pressure sensor 365, or a switch 366 may be utilized as sensors to detect user activity with respect to a rate of turn or mode of operation (e.g., whether control signals are to be received by the trolling motor assembly 300, the sonar assembly 380, or both). Further, lever 360 and push button 370 may be mechanical devices that are operably coupled to a sensor and may interface directly with a user to facilitate inputting either a rate of turn or a mode selection by the user via the user input assembly 350. For example, a user may manipulate one of lever 360 and push button 370 to determine whether navigation control device provides control signals to either trolling motor assembly 300, sonar assembly 380, or both.

According to some example embodiments, a deflection sensor 355 and a lever 360 may be utilized as the user input assembly 350. The deflection sensor 355 may be any type of sensor that can measure an angle of deflection of an object, for example, a lever 360, such as from a center or zero position. In this regard, the processor 335 may be configured to determine a desired rate of turn of the propulsion/transmission direction based on an angle of deflection (e.g., from a set point or origin) of the lever 360 measured by the deflection sensor 355. For example, as a user increases the angle of deflection, for example, from an origin, a rate of turn for the direction of propulsion/transmission may also increase thereby implementing a variable rate of turn for the propulsion/transmission direction. In other words, for example, as the angle of deflection increases, rotation of the propulsion/transmission direction accelerates.

According to some embodiments, rather than using techniques that measure an angle of deflection, a pressure sensor 365 may be used in conjunction with, for example, either the lever 360 or a push button 370 to determine a rate of turn. In this regard, the pressure sensor 365 may be configured to detect an amount of pressure applied on the pressure sensor by a user and provide a pressure value to the processor 335 based on the detected amount of pressure. In turn, the processor 335 may be configured to determine a rate of turn based on the pressure value. According to some example embodiments, higher detected amounts of pressure may indicate a higher rate of turn. The rate of turn may have a linear or exponential relationship to the pressure value.

According to some example embodiments, a rate of turn may be determined based on a duration of time that a switch, such as switch 366, is in an active position. In this regard, switch 366 may have two states an active state (e.g., "on") and an inactive state (e.g., "off"). According to some example embodiments, switch 366 may normally be in the inactive state and user activity, such as actuation of the lever 360 or the push button 370, may be required to place the switch 366 in the active state. When in the active state, a duration of time in the active state may be detected and the rate of turn may be a function of the duration of time that the switch 366 is in the active state.

Example embodiments include methods of controlling operation of a trolling motor assembly and/or sonar assembly, such as shown in FIG. 16 and in the associated description. In this regard, FIG. 16 illustrates a flowchart of various operations that may, for example, be performed by, with the assistance of, or under the control of one or more of the processors 305a and 305b, and 335, or with other associated components described with respect to FIG. 9 or otherwise herein, and these components may therefore constitute means for performing the respective operations.

In this regard, the example method may include determining a mode at 600. According to some example embodiments, determining the mode may include detecting a mode of operation of the user input assembly for controlling either a trolling motor assembly, a sonar assembly, or both. At 610, the example method may include detecting user activity at the user input assembly. According to some example embodiments, detecting the user activity may include detecting an angle of deflection of a lever (e.g., a foot pedal or a rocker button), detecting a rate at which an angle of deflection of a lever changes with respect to time, detecting a switch being in an active state, detecting an amount of pressure on a pressure sensor, or the like. At 620, the example method may include determining a direction of turn based on the user activity. In this regard, determining the direction of turn may include determining the direction of turn based on an angle of deflection of a lever, a duration of time that a switch is in an active state, an amount of pressure on a pressure sensor, a point of interest, or the like. Further, at 630, the example method may include generating, by a processor in operable communication with the user input assembly, one or more turning input signals. In this regard, the one or more turning input signals may be electrical signals indicating a direction of turn. The example method may include, at 640, transmitting the turning input signals to at least one of a steering actuator and a directional actuator based on the detected mode and, at 650, adjusting at least one of a direction of a propulsion motor and a direction of a sonar assembly, via the actuators, respectively, in the desired direction based on the turning input signals.

Example embodiments also include methods of controlling operation of a trolling motor assembly and/or sonar assembly, such as shown in FIG. 17 and in the associated description. In this regard, FIG. 17 illustrates a flowchart of various operations that may, for example, be performed by, with the assistance of, or under the control of one or more of the processors 305*a* and 305*b*, and 335, or with other associated components described with respect to FIG. 9 or otherwise herein, and these components may therefore constitute means for performing the respective operations.

In this regard, the example method may, at 700, include detecting user input corresponding to a desired direction that the user wishes the propulsion motor and the sonar assembly to point, such as a point of interest, navigation direction, etc. At 710, the example method may include detecting an initial direction of a propulsion motor and an initial direction of a sonar assembly. Further, at 720, the example method may include determining patterns of adjustment for the motor and the sonar assembly based on the desired direction and the detected initial directions. At 730, the method may include generating by way of a processor in operable communication with the user input assembly, turning input signals. The turning input signals may be generated in accordance with the patterns determined at 720. At 740, the method may include transmitting the turning input signals to a steering actuator of the propulsion motor and to a directional actuator of the sonar assembly. Finally, at 750, the method may include adjusting at least one of a direction of the propulsion motor and a direction of the sonar assembly, via the actuators, respectively, in the patterns of adjustment based on the turning input signals, such that the direction of the propulsion motor and the direction of the sonar assembly point toward the desired direction.

Each of FIGS. 16-17 and the associated description illustrates a collection of operations of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 310*a*, 310*b*, or 340 and executed by, for example, the processor 305*a*, 305*b*, or 335. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowchart block(s).

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A system comprising:
  a trolling motor assembly comprising a propulsion motor and a steering actuator, wherein the steering actuator is configured to adjust a direction of the propulsion motor;
  a sonar assembly comprising a transducer assembly and a directional actuator, wherein the directional actuator is configured to adjust a direction of the transducer assembly,
    wherein the directional actuator is configured to independently reorient with respect to the steering actuator of the trolling motor assembly;
  a user input assembly, wherein the user input assembly is configured to detect user activity related to at least one of controlling the direction of the propulsion motor of the trolling motor assembly or controlling the direction of the transducer assembly of the sonar assembly;
  a processor, wherein the processor is configured to:
    receive user input via the user input assembly;
    determine whether the received user input corresponds to either (a) a desired directional turning of both the direction of the propulsion motor of the trolling motor assembly and the direction of the transducer assembly of the sonar assembly or (b) a desired independent directional turning of either the direction of the propulsion motor of the trolling motor assembly or the direction of the transducer assembly of the sonar assembly;

in an instance in which the user input corresponds to (a) the desired directional turning of both the direction of the propulsion motor of the trolling motor assembly and the direction of the transducer assembly of the sonar assembly:
  generate at least one first turning input signal to cause the steering actuator of the trolling motor assembly to cause the direction of the propulsion motor to adjust in a direction indicated by the user input and to cause the directional actuator of the sonar assembly to cause the direction of the transducer assembly to adjust in the direction indicated by the user input such that both the direction of the propulsion motor and the direction of the transducer assembly adjust in a same direction; and
  cause the at least one first turning input signal to be provided to the steering actuator to cause the adjustment of the direction of the propulsion motor and to be provided to the directional actuator to cause the adjustment of the direction of the transducer assembly,
  wherein the desired directional turning of both the direction of the propulsion motor of the trolling motor assembly and the direction of the transducer assembly of the sonar assembly is a desired synchronized directional turning of both the direction of the propulsion motor of the trolling motor assembly and the direction of the transducer assembly of the sonar assembly; or
in an instance in which the user input corresponds to (b) the desired independent directional turning of either the direction of the propulsion motor of the trolling motor assembly or the direction of the transducer assembly of the sonar assembly:
  determine whether the received user input corresponds to the desired independent directional turning of either (i) the direction of the propulsion motor of the trolling motor assembly or (ii) the direction of the transducer assembly of the sonar assembly;
  in an instance in which the user input corresponds to (i) the direction of the propulsion motor of the trolling motor assembly:
    generate at least one second turning input signal to cause the steering actuator of the trolling motor assembly to cause the direction of the propulsion motor to adjust in a direction indicated by the user input such that the direction of the propulsion motor changes independent of the direction of the transducer assembly; and
    cause the at least one second turning input signal to be provided to the steering actuator to cause the adjustment of the direction of the propulsion motor; or
  in an instance in which the user input corresponds to (ii) the direction of the transducer assembly of the sonar assembly:
    generate at least one third turning input signal to cause the directional actuator of the sonar assembly to cause the direction of the transducer assembly to adjust in the direction indicated by the user input such that the direction of the transducer assembly changes independent of the direction of the propulsion motor; and
    cause the at least one third turning input signal to be provided to the directional actuator to cause the adjustment of the direction of the transducer assembly.

2. The system of claim 1, wherein the processor is further configured to:
  generate at least one correction signal to cause either the steering actuator of the trolling motor assembly to cause the direction of the propulsion motor to adjust or the directional actuator of the sonar assembly to cause the direction of the transducer assembly to adjust, such that the propulsion motor and the transducer assembly each faces in a same final direction after application of a corrective rotation caused by the at least one correction signal; and
  cause the at least one correction signal to be provided to the steering actuator to cause the adjustment of the direction of the propulsion motor or to be provided to the directional actuator to cause the adjustment of the direction of the transducer assembly.

3. The system of claim 2, wherein, in the instance in which the user input corresponds to (a) the desired directional turning of both the direction of the propulsion motor of the trolling motor assembly and the direction of the transducer assembly of the sonar assembly, the processor is further configured to cause the at least one correction signal to be provided to the steering actuator to cause the adjustment of the direction of the propulsion motor or to be provided to the directional actuator to cause the adjustment of the direction of the transducer assembly before it causes the at least one first turning input signal to be provided to the steering actuator to cause the adjustment of the direction of the propulsion motor and to be provided to the directional actuator to cause the adjustment of the direction of the transducer assembly.

4. The system of claim 2, wherein the processor is further configured to:
  determine which of the propulsion motor and the transducer assembly faces in a direction that is farther from a neutral direction; and
  in an instance in which the propulsion motor faces in a direction that is farther from the neutral direction:
    generate the at least one correction signal to cause the steering actuator of the trolling motor assembly to cause the direction of the propulsion motor to adjust, such that the propulsion motor and the transducer assembly each faces in a same direction after adjustment; and
    cause the at least one correction signal to be provided to the steering actuator to cause the adjustment of the direction of the propulsion motor; or
  in an instance in which the transducer assembly faces in a direction that is farther from the neutral direction:
    generate the at least one correction signal to cause the directional actuator of the sonar assembly to cause the direction of the transducer assembly to adjust, such that the propulsion motor and the transducer assembly each faces in a same direction after adjustment; and
    cause the at least one correction signal to be provided to the directional actuator to cause the adjustment of the direction of the transducer assembly.

5. The system of claim 1, wherein the processor is further configured to:
  generate at least one first correction signal to cause the steering actuator of the trolling motor assembly to cause the direction of the propulsion motor to adjust and at least one second correction signal to cause the directional actuator of the sonar assembly to cause the direction of the transducer assembly to adjust, such that the propulsion motor and the transducer assembly each faces in a same final direction after adjustment; and cause the at least one first correction signal to be provided to the steering actuator to cause the adjustment of the direction of the propulsion motor and the at least one second correction signal to be provided to the directional actuator to cause the adjustment of the direction of the transducer assembly.

6. The system of claim 5, wherein the first correction signal includes a first rate of turn, wherein the second correction signal includes a second rate of turn, and wherein the first rate of turn and second rate of turn are configured such that the propulsion motor and the transducer assembly each faces in the same final direction at a same time.

7. The system of claim 1, wherein the user input assembly comprises a mode select button, wherein the mode select button comprises at least a first mode indicating that the trolling motor assembly and the sonar assembly should be controlled at a same time, and wherein the first mode corresponds to the instance in which the user input corresponds to (a) the desired directional turning of both the direction of the propulsion motor of the trolling motor assembly and the direction of the transducer assembly of the sonar assembly.

8. The system of claim 7, wherein the mode select button comprises a second mode indicating that either the trolling motor assembly or the sonar assembly should be controlled independently, and wherein the second mode corresponds to the instance in which the user input corresponds to (b) the desired independent directional turning of either the direction of the propulsion motor of the trolling motor assembly or the direction of the transducer assembly of the sonar assembly.

9. The system of claim 1, wherein the sonar assembly is attached to the trolling motor assembly.

10. The system of claim 1, wherein the sonar assembly is separate from the trolling motor assembly.

11. The system of claim 1, wherein the user input assembly includes a foot pedal.

12. The system of claim 1, wherein the user input assembly includes a wireless remote.

13. The system of claim 1, wherein the user input assembly includes a multi-function display.

14. The system of claim 1, wherein the at least one first turning input signal causes the propulsion motor of the trolling motor assembly and the transducer assembly of the sonar assembly to move simultaneously while pointing in the same direction.

15. The system of claim 1, wherein, in the instance in which the user input corresponds to (a) the desired directional turning of both the direction of the propulsion motor of the trolling motor assembly and the direction of the transducer assembly of the sonar assembly, the processor is further configured to generate the at least one first turning input signal to cause the steering actuator of the trolling motor assembly to cause the direction of the propulsion motor to rotate in a direction indicated by the user input and the directional actuator of the sonar assembly to cause the direction of the transducer assembly to rotate in the direction indicated by the user input such that both the direction of the propulsion motor and the direction of the transducer assembly rotate at a same speed of rotation.

16. A system comprising:

a user input assembly, wherein the user input assembly is configured to receive a mode selection, wherein the user input assembly is configured to detect user activity related to at least one of either controlling a direction of a propulsion motor of a trolling motor assembly with a steering actuator or a direction of a transducer assembly of a sonar assembly with a directional actuator, and wherein the directional actuator is configured to independently reorient with respect to the steering actuator of the trolling motor assembly;

a processor, the processor configured to:

receive user input via the user input assembly;

determine whether the received user input corresponds to either (a) a desired directional turning of both the direction of the propulsion motor of the trolling motor assembly and the direction of the transducer assembly of the sonar assembly or (b) a desired independent directional turning of either the direction of the propulsion motor of the trolling motor assembly or the direction of the transducer assembly of the sonar assembly;

in an instance in which the user input corresponds to (a) the desired directional turning of both the direction of the propulsion motor of the trolling motor assembly and the direction of the transducer assembly of the sonar assembly:

generate at least one first turning input signal to cause the steering actuator of the trolling motor assembly to cause the direction of the propulsion motor to adjust in a direction indicated by the user input and the directional actuator of the sonar assembly to cause the direction of the transducer assembly to adjust in the direction indicated by the user input such that both the direction of the propulsion motor and the direction of the transducer assembly adjust in the same direction; and cause the at least one first turning input signal to be provided to the steering actuator to cause the adjustment of the direction of the propulsion motor and to be provided to the directional actuator to cause the adjustment of the direction of the transducer assembly, wherein the at least one first turning input signal causes the steering actuator of the trolling motor assembly to cause the direction of the propulsion motor to rotate in a direction indicated by the user input and the directional actuator of the sonar assembly to cause the direction of the transducer assembly to rotate in the direction indicated by the user input such that both the direction of the propulsion motor and the direction of the transducer assembly rotate at a same speed of rotation; or in an instance in which the user input corresponds to (b) the desired independent directional turning of either the direction of the propulsion motor of the trolling motor assembly or the direction of the transducer assembly of the sonar assembly:

determine whether the received user input corresponds to the desired independent directional turning of either (i) the direction of the propulsion motor of the trolling motor assembly or (ii) the direction of the transducer assembly of the sonar assembly;

in an instance in which the user input corresponds to (i) the direction of the propulsion motor of the trolling motor assembly:

generate at least one second turning input signal to cause the steering actuator of the trolling motor assembly to cause the direction of the propulsion motor to adjust in a direction indicated by the user input such that the direction of the propulsion motor changes independent of the direction of the transducer assembly; and cause the at least one second turning input signal to be provided to the steering actuator to cause the adjustment of the direction of the propulsion motor; and in an instance in which the user input corresponds to (ii) the direction of the transducer assembly of the sonar assembly:

generate at least one third turning input signal to cause the directional actuator of the sonar assembly to cause the direction of the transducer assembly to adjust in the direction indicated by the user input such that the direction of the transducer assembly changes independent of the direction of the propulsion motor; and cause the at least one third turning input signal to be provided to the directional actuator to cause the adjustment of the direction of the transducer assembly.

17. A system comprising:

a trolling motor assembly comprising a propulsion motor and a steering actuator, wherein the steering actuator is configured to adjust a direction of the propulsion motor;

a sonar assembly comprising a transducer assembly and a directional actuator, wherein the directional actuator is configured to adjust a direction of the transducer assembly, wherein the directional actuator is configured to independently reorient with respect to the steering actuator of the trolling motor assembly;

a user input assembly, wherein the user input assembly is configured to detect user activity related to at least one of either controlling the direction of the propulsion motor of the trolling motor assembly or the direction of the transducer assembly of the sonar assembly;

a processor, the processor configured to:

receive user input via the user input assembly;

determine an instance in which the user input corresponds to a desired directional turning of both the direction of the propulsion motor of the trolling motor assembly and the direction of the transducer assembly of the sonar assembly and, in response thereto:

generate a first turning input signal to cause the steering actuator of the trolling motor assembly to cause the direction of the propulsion motor to adjust in a direction indicated by the user input such that the direction of the propulsion motor adjusts according to a first adjustment protocol that causes the propulsion motor to reorient toward a desired point of interest;

generate a second turning input signal to cause the directional actuator of the sonar assembly to cause the direction of the transducer assembly to adjust in the direction indicated by the user input such that the direction of the transducer assembly adjusts according to a second adjustment protocol that causes the transducer assembly to point toward the desired point of interest;

cause the first turning input signal to be provided to the steering actuator to cause the adjustment of the direction of the propulsion motor; and cause the second turning input signal to be provided to the directional actuator to cause the adjustment of the direction of the transducer assembly, wherein the desired directional turning of both the direction of the propulsion motor of the trolling motor assembly and the direction of the transducer assembly of the sonar assembly is a desired synchronized directional turning of both the direction of the propulsion motor of the trolling motor assembly and the direction of the transducer assembly of the sonar assembly.

18. The system of claim 17, wherein the processor is further configured to:

generate at least one correction signal to cause either the steering actuator of the trolling motor assembly to cause the direction of the propulsion motor to adjust or the directional actuator of the sonar assembly to cause the direction of the transducer assembly to adjust, such that the propulsion motor and the transducer assembly each faces in a same final direction after adjustment; and cause the at least one correction signal to be provided to the steering actuator to cause the adjustment of the direction of the propulsion motor or to be provided to the directional actuator to cause the adjustment of the direction of the transducer assembly.

19. The system of claim 18, wherein the processor is further configured to:

determine which of the propulsion motor and the transducer assembly faces in a direction that is farther from a neutral direction; and in an instance in which the propulsion motor faces in a direction that is farther from the neutral direction:

generate the at least one correction signal to cause the steering actuator of the trolling motor assembly to cause the direction of the propulsion motor to adjust, such that the propulsion motor and the transducer assembly each faces in the same direction after adjustment; and cause the at least one correction signal to be provided to the steering actuator to cause the adjustment of the direction of the propulsion motor; or in an instance in which the transducer assembly faces in a direction that is farther from the neutral direction:

generate the at least one correction signal to cause the directional actuator of the sonar assembly to cause the direction of the transducer assembly to adjust, such that the propulsion motor and the transducer assembly each faces in the same direction after adjustment; and cause the at least one correction signal to be provided to the directional actuator to cause the adjustment of the direction of the transducer assembly.

20. The system of claim 17, wherein the processor is further configured to:

generate at least one first correction signal to cause the steering actuator of the trolling motor assembly to cause the direction of the propulsion motor to adjust and at least one second correction signal to cause the directional actuator of the sonar assembly to cause the direction of the transducer assembly to adjust, such that the propulsion motor and the transducer assembly each faces in the same final direction after adjustment; and cause the at least one first correction signal to be provided to the steering actuator to cause the adjustment of the direction of the propulsion motor and the at least one second correction signal to be provided to the directional actuator to cause the adjustment of the direction of the transducer assembly.

21. The system of claim 20, wherein the first correction signal includes a first rate of turn, wherein the second correction signal includes a second rate of turn, and wherein the first rate of turn and second rate of turn are configured such that the propulsion motor and the transducer assembly each faces in the same final direction at a same time.

22. A system comprising:
a trolling motor assembly comprising a propulsion motor and a steering actuator, wherein the steering actuator is configured to adjust a direction of the propulsion motor;
a sonar assembly comprising a transducer assembly and a directional actuator, wherein the directional actuator is configured to adjust a direction of the transducer assembly, wherein the directional actuator is configured to independently reorient with respect to the steering actuator of the trolling motor assembly;
a user input assembly, wherein the user input assembly is configured to detect user activity related to at least one of controlling the direction of the propulsion motor of the trolling motor assembly or controlling the direction of the transducer assembly of the sonar assembly;
a processor, wherein the processor is configured to:
receive user input via the user input assembly;
determine whether the received user input corresponds to either (a) a desired directional turning of both the direction of the propulsion motor of the trolling motor assembly and the direction of the transducer assembly of the sonar assembly or (b) a desired independent directional turning of either the direction of the propulsion motor of the trolling motor assembly or the direction of the transducer assembly of the sonar assembly;
in an instance in which the user input corresponds to (a) the desired directional turning of both the direction of the propulsion motor of the trolling motor assembly and the direction of the transducer assembly of the sonar assembly:
generate at least one correction signal to cause either the steering actuator of the trolling motor assembly to cause the direction of the propulsion motor to adjust or the directional actuator of the sonar assembly to cause the direction of the transducer assembly to adjust, such that the propulsion motor and the transducer assembly each faces in a same final direction after application of a corrective rotation caused by the at least one correction signal;
cause the at least one correction signal to be provided to the steering actuator to cause the adjustment of the direction of the propulsion motor or to be provided to the directional actuator to cause the adjustment of the direction of the transducer assembly;
generate at least one first turning input signal to cause the steering actuator of the trolling motor assembly to cause the direction of the propulsion motor to adjust in a direction indicated by the user input and to cause the directional actuator of the sonar assembly to cause the direction of the transducer assembly to adjust in the direction indicated by the user input such that both the direction of the propulsion motor and the direction of the transducer assembly adjust in a same direction; and
cause the at least one first turning input signal to be provided to the steering actuator to cause the adjustment of the direction of the propulsion motor and to be provided to the directional actuator to cause the adjustment of the direction of the transducer assembly; or
in an instance in which the user input corresponds to (b) the desired independent directional turning of either the direction of the propulsion motor of the trolling motor assembly or the direction of the transducer assembly of the sonar assembly:
determine whether the received user input corresponds to the desired independent directional turning of either (i) the direction of the propulsion motor of the trolling motor assembly or (ii) the direction of the transducer assembly of the sonar assembly;
in an instance in which the user input corresponds to (i) the direction of the propulsion motor of the trolling motor assembly:
generate at least one second turning input signal to cause the steering actuator of the trolling motor assembly to cause the direction of the propulsion motor to adjust in a direction indicated by the user input such that the direction of the propulsion motor changes independent of the direction of the transducer assembly; and
cause the at least one second turning input signal to be provided to the steering actuator to cause the adjustment of the direction of the propulsion motor; or
in an instance in which the user input corresponds to (ii) the direction of the transducer assembly of the sonar assembly:
generate at least one third turning input signal to cause the directional actuator of the sonar assembly to cause the direction of the transducer assembly to adjust in the direction indicated by the user input such that the direction of the transducer assembly changes independent of the direction of the propulsion motor; and
cause the at least one third turning input signal to be provided to the directional actuator to cause the adjustment of the direction of the transducer assembly.

23. A system comprising:
a trolling motor assembly comprising a propulsion motor and a steering actuator, wherein the steering actuator is configured to adjust a direction of the propulsion motor;
a sonar assembly comprising a transducer assembly and a directional actuator, wherein the directional actuator is configured to adjust a direction of the transducer assembly,
wherein the directional actuator is configured to independently reorient with respect to the steering actuator of the trolling motor assembly;
a user input assembly, wherein the user input assembly is configured to detect user activity related to at least one of controlling the direction of the propulsion motor of the trolling motor assembly or controlling the direction of the transducer assembly of the sonar assembly;

a processor, wherein the processor is configured to:
receive user input via the user input assembly;
determine whether the received user input corresponds to either (a) a desired directional turning of both the direction of the propulsion motor of the trolling motor assembly and the direction of the transducer assembly of the sonar assembly or (b) a desired independent directional turning of either the direction of the propulsion motor of the trolling motor assembly or the direction of the transducer assembly of the sonar assembly;
in an instance in which the user input corresponds to (a) the desired directional turning of both the direction of the propulsion motor of the trolling motor assembly and the direction of the transducer assembly of the sonar assembly:
  generate at least one first correction signal to cause the steering actuator of the trolling motor assembly to cause the direction of the propulsion motor to adjust and at least one second correction signal to cause the directional actuator of the sonar assembly to cause the direction of the transducer assembly to adjust, such that the propulsion motor and the transducer assembly each faces in a same final direction after adjustment;
  cause the at least one first correction signal to be provided to the steering actuator to cause the adjustment of the direction of the propulsion motor and the at least one second correction signal to be provided to the directional actuator to cause the adjustment of the direction of the transducer assembly;
  generate at least one first turning input signal to cause the steering actuator of the trolling motor assembly to cause the direction of the propulsion motor to adjust in a direction indicated by the user input and to cause the directional actuator of the sonar assembly to cause the direction of the transducer assembly to adjust in the direction indicated by the user input such that both the direction of the propulsion motor and the direction of the transducer assembly adjust in a same direction; and
  cause the at least one first turning input signal to be provided to the steering actuator to cause the adjustment of the direction of the propulsion motor and to be provided to the directional actuator to cause the adjustment of the direction of the transducer assembly; or
in an instance in which the user input corresponds to (b) the desired independent directional turning of either the direction of the propulsion motor of the trolling motor assembly or the direction of the transducer assembly of the sonar assembly:
  determine whether the received user input corresponds to the desired independent directional turning of either (i) the direction of the propulsion motor of the trolling motor assembly or (ii) the direction of the transducer assembly of the sonar assembly;
  in an instance in which the user input corresponds to (i) the direction of the propulsion motor of the trolling motor assembly:
    generate at least one second turning input signal to cause the steering actuator of the trolling motor assembly to cause the direction of the propulsion motor to adjust in a direction indicated by the user input such that the direction of the propulsion motor changes independent of the direction of the transducer assembly; and
    cause the at least one second turning input signal to be provided to the steering actuator to cause the adjustment of the direction of the propulsion motor; or
  in an instance in which the user input corresponds to (ii) the direction of the transducer assembly of the sonar assembly:
    generate at least one third turning input signal to cause the directional actuator of the sonar assembly to cause the direction of the transducer assembly to adjust in the direction indicated by the user input such that the direction of the transducer assembly changes independent of the direction of the propulsion motor; and
    cause the at least one third turning input signal to be provided to the directional actuator to cause the adjustment of the direction of the transducer assembly.

* * * * *